(12) United States Patent
Kanelovitch et al.

(10) Patent No.: US 12,157,322 B2
(45) Date of Patent: Dec. 3, 2024

(54) METHOD, SYSTEM AND PATTERNS FOR ALIGNING PRINT-HEADS IN A DIGITAL PRINTING PRESS

(71) Applicant: Advanced Vision Technology (A.V.T.) Ltd., Hod Hasharon (IL)

(72) Inventors: Leon Kanelovitch, Hod Hasharon (IL); Chanan Gazala, Kfar Saba (IL)

(73) Assignee: Advanced Vision Technology (A.V.T.) Ltd., Hod Hasharon (IL)

( * ) Notice: Subject to any disclaimer, the term of this patent is extended or adjusted under 35 U.S.C. 154(b) by 0 days.

(21) Appl. No.: 17/797,542

(22) PCT Filed: Feb. 4, 2021

(86) PCT No.: PCT/IB2021/050905
§ 371 (c)(1),
(2) Date: Aug. 4, 2022

(87) PCT Pub. No.: WO2021/156785
PCT Pub. Date: Aug. 12, 2021

(65) Prior Publication Data
US 2023/0347658 A1   Nov. 2, 2023

Related U.S. Application Data

(60) Provisional application No. 62/969,678, filed on Feb. 4, 2020.

(51) Int. Cl.
*B41J 2/21*   (2006.01)
*B41J 29/393*   (2006.01)

(52) U.S. Cl.
CPC ........... *B41J 2/2135* (2013.01); *B41J 29/393* (2013.01); *B41J 2029/3935* (2013.01)

(58) Field of Classification Search
CPC ...... B41J 2/2135; B41J 2/2146; B41J 29/393; B41J 2/155; B41J 2202/20;
(Continued)

(56) References Cited

U.S. PATENT DOCUMENTS 9,393,772 B2   7/2016   Menashe et al.
10,262,409 B2   4/2019   Dekel-Klein et al.
(Continued)

FOREIGN PATENT DOCUMENTS

JP   2010125806 A   6/2010
JP   2018094821 A   6/2018

OTHER PUBLICATIONS

International Preliminary Report on Patentability for International Application No. PCT/IB2021/050905, dated Jul. 28, 2022, 9 pages.
(Continued)

*Primary Examiner* — Jannelle M Lebron
(74) *Attorney, Agent, or Firm* — Buchanan Ingersoll & Rooney PC

(57) ABSTRACT

A system for aligning print-heads in a printing-press, which includes a print-head array which includes a plurality of print-head-rows. Each print-head-row includes a plurality of print-heads and prints print a color associated with therewith. Each print-head includes an array-of-nozzles, which includes a plurality of nozzle-lines. The system includes an imager and a processor. The imager includes at least one imaging-sensor. The imager is configured to acquire an image of a printed first-alignment-pattern and further configured to acquire an image of a printed second-alignment-pattern. The processor is configured to receive the image of the first-alignment-pattern and the image of the second-alignment-pattern and to determine alignment of reference print-heads in at least a reference-row of print-heads from the image of the first-alignment-pattern. The processor is
(Continued)

also configured to determine alignment of color print-heads in rows other than the reference-row of print-heads, relative to the reference print-heads, from the image of the second-alignment-pattern.

25 Claims, 18 Drawing Sheets

(58) Field of Classification Search
CPC ............ B41J 2029/3935; B41J 2/04505; B41J 19/145; G06K 15/027
See application file for complete search history.

(56) References Cited

U.S. PATENT DOCUMENTS

| | | |
|---|---|---|
| 10,576,751 B2 | 3/2020 | Gazala |
| 2005/0062784 A1 | 3/2005 | Matsuzaki et al. |
| 2011/0298853 A1 | 12/2011 | Takamiya et al. |
| 2015/0179434 A1 | 6/2015 | Ban et al. |

OTHER PUBLICATIONS

International Search Report and Written Opinion for International Application No. PCT/IB2021/050905, dated May 3, 2021, 11 pages.
Office Action (Communication pursuant to Article 94(3) (EPC) issued Mar. 12, 2024, by the European Patent Office in corresponding European Patent Application No. 21 707 782.5. (6 pages).
Office Action (Communication pursuant to Article 94(3) (EPC) issued Oct. 9, 2024, by the European Patent Office in corresponding European Patent Application No. 21 707 782.5-1014. (4 pages).

METHOD, SYSTEM AND PATTERNS FOR ALIGNING PRINT-HEADS IN A DIGITAL PRINTING PRESS

CROSS-REFERENCE TO RELATED APPLICATIONS

This application is a U.S. national phase application of International Application No. PCT/IB2021/050905, filed Feb. 4, 2021, claiming the benefit of U.S. Provisional Application No. 62/969,678, filed Feb. 4, 2020, the contents of each of which are incorporated herein by their entireties for all purposes.

FIELD OF THE DISCLOSED TECHNIQUE

The disclosed technique relates to printing presses in general, and to a method and system for aligning print-heads in a digital printing press, in particular.

BACKGROUND OF THE DISCLOSED TECHNIQUE

Digital printing presses in general and ink jet based printing presses in particular (e.g., printing sheets or continuous webs of labels or packaging) are required to print a print job continuously and with minimum waste. Waste is defined as printed material which is not sellable, substrate which is not used to print the printed design (i.e., the product) or is printed with the design but not at acceptable quality, and thus does not generate revenue generation and the like. Digital printing presses typically employ print-heads to print the design on a substrate (e.g., a sheet or a web). These print-heads are typically arranged in rows, where each row of print-heads prints a respective color. These print-heads need to be aligned within a certain degree of error. Should the print-heads not be aligned, the quality of the printed design may degrade.

U.S. Patent Application Publication 2015/0174934 to Bogart, entitled "System and Process for Automatic Print Head Registration of a Digital Printing Machine" directs to a printing a calibration test page which includes overlapping registration targets created by the first and second print heads. Each of the overlapping registration targets includes a target region comprising X and Y co-ordinates. The overlapping registration targets are scanned to produce an image. The image is processed to produce a miss-registration score for each target region. An X and Y registration correction amounts for the second print head based upon the miss-registration scores and the second print head is adjust based upon the X and Y registration correction amounts.

SUMMARY OF THE PRESENT DISCLOSED TECHNIQUE

It is an object of the disclosed technique to provide a novel method, system and patterns for aligning print-heads in a digital printing press. In accordance with the disclosed technique, there is thus provided a system for aligning print-heads in a printing press. The printing press includes a print-head array which includes a plurality of print-head rows. Each print-head row includes a plurality of print-heads. The print-heads in each print-head row print a color associated with the print-head row. Each print-head includes an array of nozzles. The array of nozzles includes a plurality of nozzle lines. The system includes an imager and a processor. The Imager Includes at least one imaging sensor. The imager is configured to acquire an image of a printed first alignment pattern and further configured to acquire an image of a printed second alignment pattern. The processor is configured to receive the image of the first alignment pattern and the image of the second alignment pattern. The processor is further configured to determine alignment of reference print-heads in at least a reference row of print-heads from the image of the first alignment pattern. The processor is also configured to determine alignment of color print-heads in rows other than the reference row of print-heads, relative to the reference print-heads, from the image of the second alignment pattern.

In accordance with another aspect of the disclosed technique, there is thus provided a method for aligning print-heads in a printing press. The printing press includes a print-head array which includes a plurality of print-head rows. Each print-head row includes a plurality of print-heads. The print-heads in each print-head row print a color associated with the print-head row. Each print-head includes an array of nozzles. The array of nozzles includes a plurality of nozzle lines. The method includes the steps of printing a first alignment pattern on a substrate, the first alignment pattern includes a first print-head pattern respective of each the print-head in each of the print-head rows and acquiring an image of a printed the first alignment pattern. The method also includes the steps of determining from the acquired image of the printed first alignment pattern a respective print-head rotation angle for each print-head, and determining horizontal and vertical displacement respective of each the print-head in at least a reference row of print-heads, from the acquired image of the first alignment pattern. The method further includes the steps of printing a second alignment pattern on the substrate, acquiring an image of the printed second alignment pattern and determining horizontal and vertical displacement of each print-head other than the reference print-heads, relative to a reference print-head, from the acquired image of the second alignment pattern.

In accordance with a further aspect of the disclosed technique, there is thus provided a pattern for aligning print-heads in a printing press. The printing press includes a print-head array. The print head array includes a plurality of print-head rows. Each print-head row includes a plurality of print-heads. The print-heads in each print-head row print a color associated with the print-head row. The pattern includes, for each print-head in each row of print-heads, a print-head pattern. The print-head pattern includes at least two dots. The at least two dots in the print-head pattern correspond to respective at least two nozzles from two different nozzle lines in a respective print-head. A theoretical vertical distance and a theoretical horizontal distance between two of said at least two printing nozzles is known.

In accordance with a further aspect of the disclosed technique, there is thus provided a pattern for aligning print-heads in a printing press. The printing press includes a print-head array. The print-head array includes a plurality of print-head rows. Each print-head row includes a plurality of print-heads. Each print-head in a print-head row is associated with a respective row location. Each print-head includes an array of nozzles. The array of nozzles includes a plurality of nozzle lines. The pattern includes a plurality of color print-head patterns and a plurality of reference print-head patterns. Each reference print-head pattern printed by a respective one of the reference print-heads. Each color print-head pattern is printed by a respective color print-head in a print-head row other than the reference row. Each color print-head pattern is associated with a respective first reference print-head pattern and a respective second reference print-head pattern. The first reference print-head pattern and the second reference print-head pattern printed by a respective reference print-head above and below the respective color print-head pattern in the vertical direction. The first reference print-head pattern, the second reference print-head pattern and the color print-head pattern printed by a same at least one nozzle in the array of nozzles of a respective print-head thereof. The color print-head pattern, the first print-head pattern and the second print-head pattern are printed by a respective print-head having a same row location.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

Figure 1:
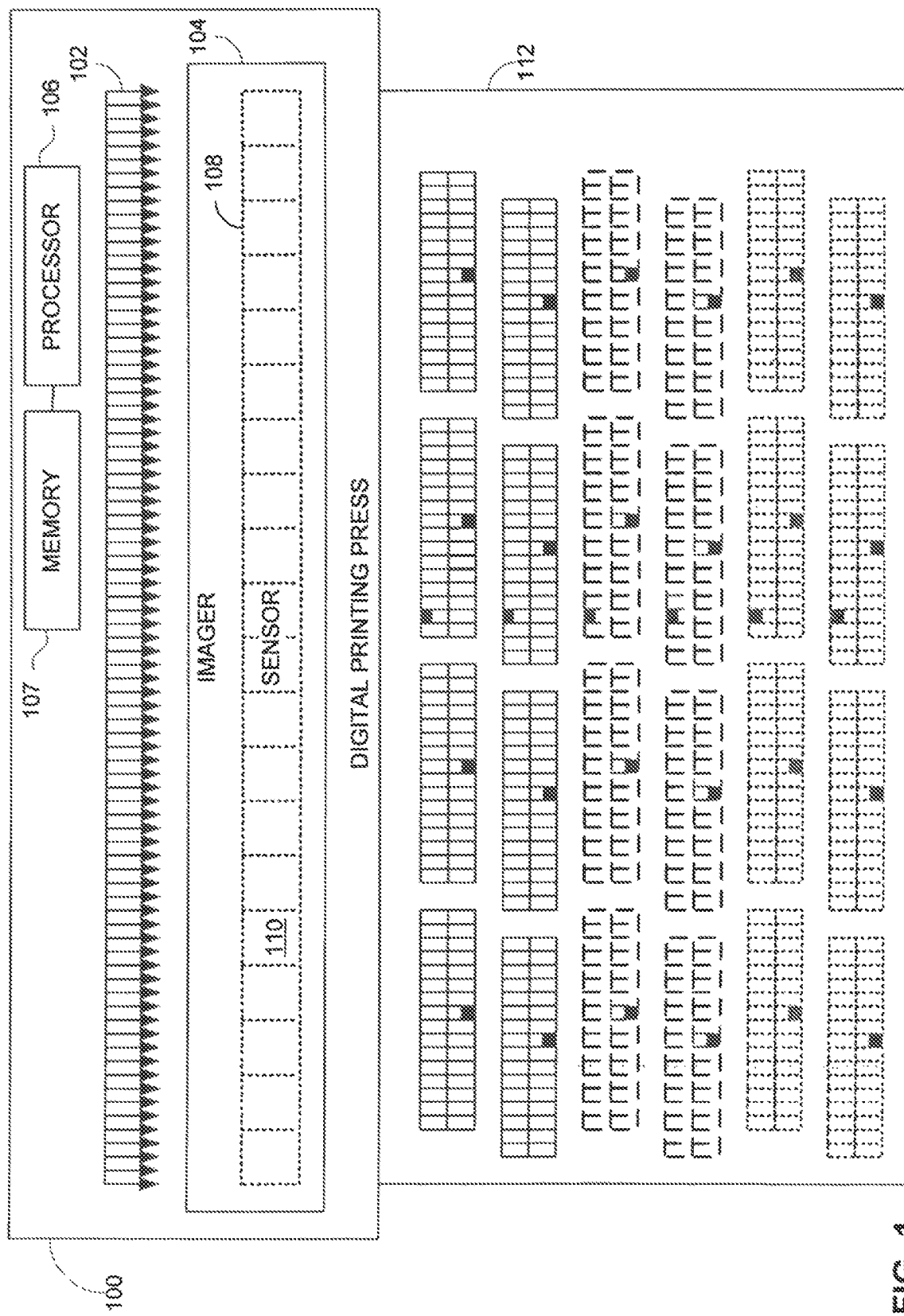
FIG. 1 is a schematic illustration of a printing press system constructed and operative in accordance with an embodiment of the disclosed technique.

The disclosed technique overcomes the disadvantages of the prior art by providing a method and system and patterns for aligning print-heads in a digital printing press. The printing press includes a print-head array. The print-head array includes a plurality of print-head rows, where each print-head row includes a plurality of print-heads. The print-heads in each print-head row print a color associated with the print-head row. Each print-head in a print-head row is associated with a respective row location.

The terms "align", "alignment" or "aligning" herein relates at least to finding the at least one of the vertical print position error (i.e., on a substrate) of a print-head relative to a reference, the horizontal print position error of a print-head relative to a reference, and the print rotation error of a print-head. The terms "align", "alignment" or "aligning" may further herein relate to employing this difference or differences for compensating for the above mentioned print-position errors. Compensating for the above mentioned print-position errors is achieved by applying corrective actions. These corrective actions include, for example, mechanically translating the print-head, mechanically rotating the print-head, adjusting activation signals (e.g., timing signal, or deflection signal) or adjusting the image data sent to the print heads. Also the term print position error and displacement are employed herein interchangeably. The terms 'reference color' and 'reference row' are employed herein interchangeably. In general, as mentioned above, a print-head array includes a plurality of print-head rows, each printing a respective color. One or more print-head rows can print any color, for example, two print-head rows print the color black. As such, when one of these rows is selected as the reference row, the corresponding black color of that row is the reference color, while the corresponding black color of the other row is not.

According to the disclosed technique, a first alignment pattern is printed on the substrate. This first alignment pattern (referred to herein as 'Target-A') is employed to align the angle (i.e., the print rotation error) of each print head, as well as aligning the print-heads of a selected reference print-head row, one with respect to the other in the cross-print (X) direction and in the substrate motion direction (Y). The first alignment pattern may further be employed to align the print-heads in the other print-head row (i.e., the print-head row other than the reference print-head row), one with respect to the other in the cross-print (X) direction and in the substrate motion direction (Y). To align the print-head rows one with respect to the other, such that all the print-heads print in register (i.e., in alignment) one with respect to the other, a second alignment pattern is printed on the substrate. This second alignment pattern includes alternating print-head patterns of a print-head from the reference print-head row and a corresponding print-head from a different color row (i.e., other than the reference row), as further elaborated below.

Reference is now made to FIG. 1, which is a schematic illustration of a printing press system, generally referenced 100, constructed and operative in accordance with an embodiment of the disclosed technique. Printing press system 100 employs head alignment according to the disclosed technique. Printing press system 100 includes print-head array 102, an imager 104, a processor 106 and optionally incudes a memory 107. Imager 104 includes an imaging sensor 108 or a plurality of imaging sensors (i.e., pixel sensors). Imager 104 may be a CMOS line scan camera or a Contact Imaging Sensor (CIS). Alternatively or additionally, imager 104 may be an area camera which acquires a two dimensional (2D) image. Print-head array 102 includes an array of print-heads as further exemplified below. Printing press system 100 prints Target-A and Target-B on a substrate 112. For example, processor 106 instructs print-head array 102 to print Target-A and Target-B on a substrate 112. In FIG. 1, only one example of Target-A is depicted. Imager 104 acquires an image or images of Target-A and Target-B. Processor 106 receives the images of Target-A and Target-B (e.g., by communication with imager 104 or from a portable memory card storing the acquired images) and determines the print position error in the X direction (dX), print position errors in the Y direction (dY) and print rotation errors (dθ) of the print-heads, as further elaborated below.

Figure 2A:
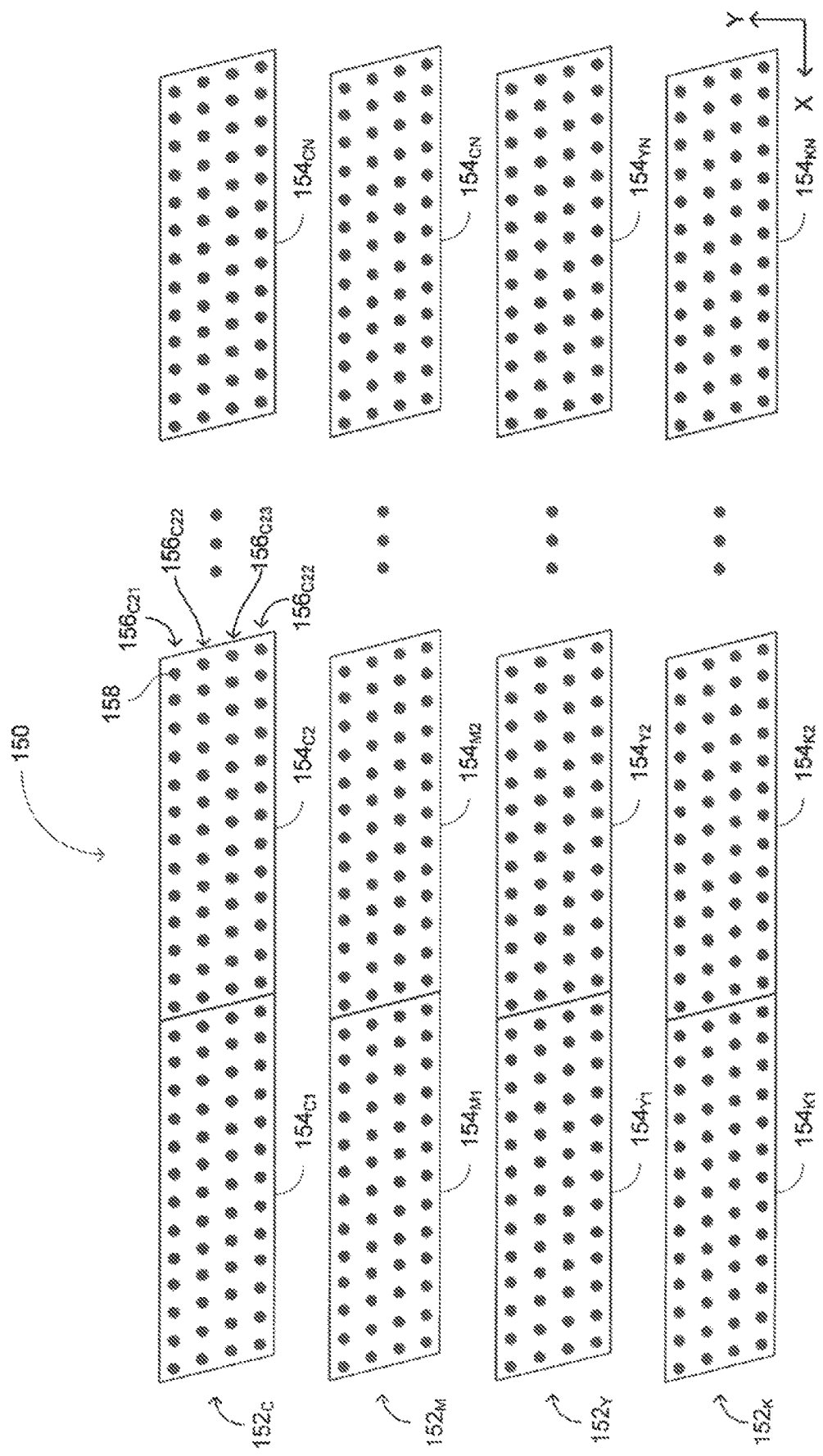
FIGS. 2A and 2B are exemplary print-head arrays which are aligned in accordance with another embodiment of the disclosed technique.
Figure 2B:
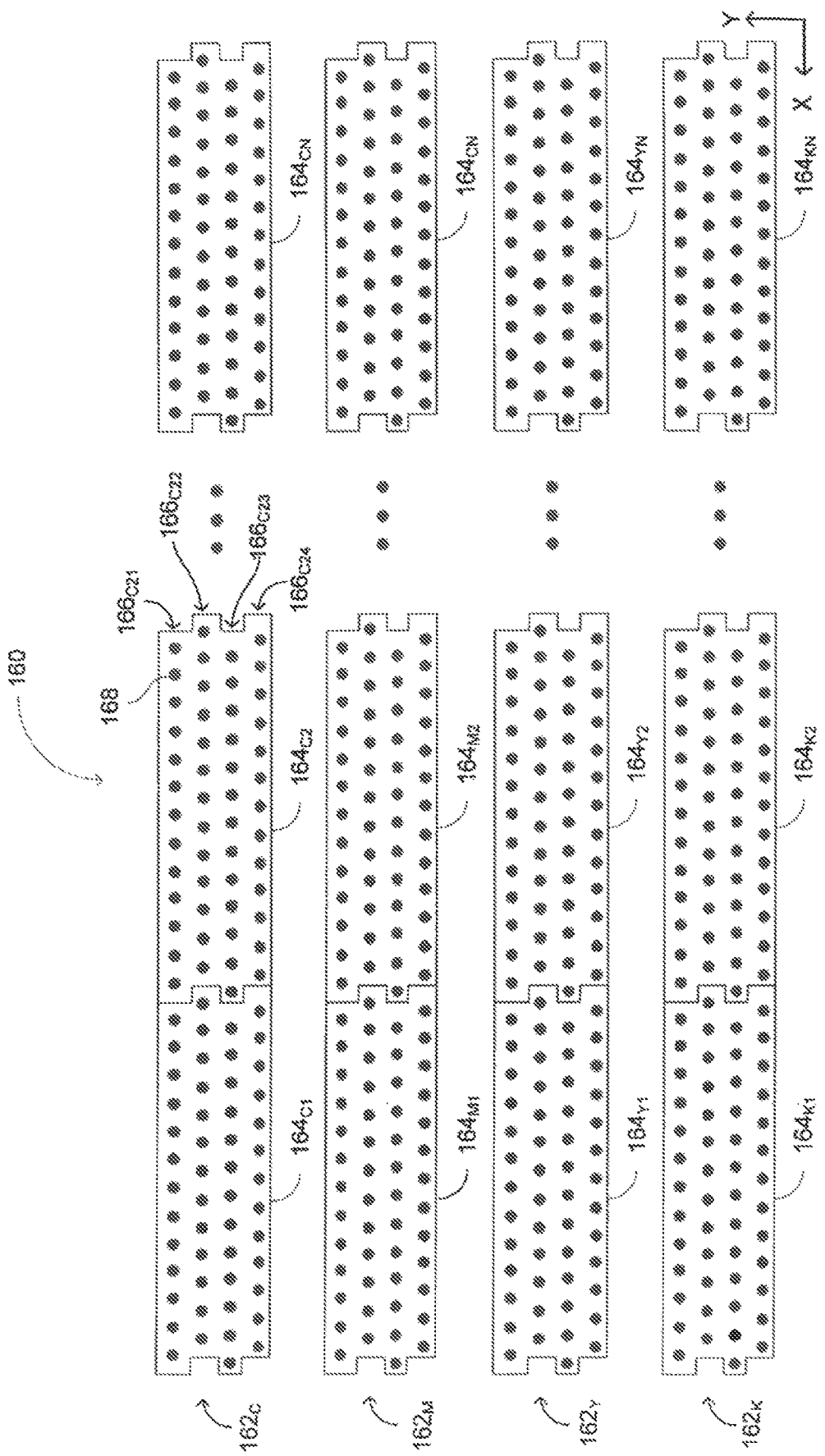

Reference is now made to FIGS. 2A and 2B which are exemplary print-head arrays, generally referenced 150 and 160 respectively, which are aligned in accordance with another embodiment of the disclosed technique. With reference to FIG. 2A, print-head array 150 includes a plurality of print-head rows, where each print-head row includes a plurality of print-heads. The print-heads in each print-head row print a color associated with the print-head row. In the example brought forth in FIG. 2A, print-head array 150 includes 4 print-head row $152_C$, $152_M$, $152_Y$ and $152_K$ printing the colors Cyan, Magenta, Yellow and Black respectively. In general, a print-head array includes a plurality of print-head rows, each print-head row printing a respective color (i.e., there can be one or more rows printing the same color). Each one of print-head rows $152_C$, $152_M$, $152_Y$ and $152_K$ includes a plurality of print-heads. Print-head row $152_C$ Includes a plurality of print-heads $154_{C1}$, $154_{C2}, \ldots, 154_{CN}$. Print-head row $152_M$ includes a plurality of print-heads $154_{M1}$, $154_{M2}, \ldots, 154_{MN}$. Print-head row $152_Y$ includes a plurality of print heads $154_{Y1}$, $154_{Y2}, \ldots, 154_{YN}$. Print-head row $152_K$ includes a plurality of print-heads $154_{K1}$, $154_{K2}, \ldots, 154_{KN}$. Each print-head includes an array of nozzles. The array of nozzles includes plurality of nozzle lines. For example, print-head $154_{C2}$ Includes 4 nozzle lines $156_{C21}$, $156_{C22}$, $156_{C23}$ and $156_{C24}$. Each nozzle line includes a plurality of nozzles such as nozzle 158. The nozzle lines are oriented in the cross-print (X) direction. In other words, the nozzle lines are oriented perpendicular to the direction of motion (Y) of the substrate on which a printed product (i.e., the printed product produced during a print job) or an alignment pattern is printed. Also, the nozzle lines are shifted one with respect to the other in the cross-print (X) direction.

With reference to FIG. 2B, and similar to exemplary print-head array 150 (FIG. 2A), print-head array 160 includes a plurality of print-heads rows, each print-heads row printing a respective color. Similar to exemplary print-head array 150 (FIG. 2A), print-head array 160 includes 4 print-head rows $162_C$, $162_M$, $162_Y$ and $162_K$ printing the colors Cyan, Magenta, Yellow and Black respectively. Each one of print-head rows $162_C$, $162_M$, $162_Y$ and $162_K$ includes a plurality of print-heads. Print-head row $162_C$ includes a plurality of print heads $164_{C1}$, $164_{C2}, \ldots, 164_{CN}$. Print-head row $162_M$ includes a plurality of print heads $164_{M1}$, $164_{M2}, \ldots, 164_{MN}$. Print-head row $162_Y$ includes a plurality of print heads $164_{Y1}$, $164_{Y2}, \ldots, 164_{YN}$. Print-head row $162_K$ includes a plurality of print heads $164_{K1}$, $164_{K2}, \ldots, 164_{KN}$. Each print-head includes an array of nozzles. The array of nozzles includes plurality of nozzle lines. In print-head array 160 each print-head includes a plurality of nozzle lines. For example, print-head $164_{C2}$ includes 4 nozzle lines $166_{C21}$, $166_{C22}$, $166_{C23}$ and $166_{C24}$. Each nozzle line includes a plurality of nozzles such as nozzle 168. The nozzle lines are oriented in the cross-print (X) direction. In other words, the nozzle lines are oriented perpendicular to the direction of motion (Y) of the substrate on which a printed product or alignment pattern is printed. Also, similar to exemplary print-head array 150 (FIG. 2A), the nozzle lines are shifted one with respect to other in the cross-print (X) direction. In general, each print-head includes at least two lines shifted one with respect to the other in the cross-print (X) direction.

The ink deposited by the print-heads in a print-head array may be subject to position errors due to mechanical misalignment of the print-heads (i.e., in the X or Y direction or mechanical rotation), or electrical miss-calibration of the activation signals of the print-heads. Consequently, the ink deposited by the print-heads may not be correctly aligned. As such, miss-registration errors in the printed design may result. For example, if the rotation angle of the print-head is incorrect, vertical streaks may result within the width of the print-head. A print position error in the X direction may result in a vertical streak, located at one edge of the misaligned print-head, as well as color overlap with other color at the other edge of the print-head. A print position error in the Y direction may result in a horizontal streak. Also, the intended distance of the substrate from the print-heads may result in a print position error (i.e., as exemplified above), since the heads may be aligned for one distance by not for another distance (e.g., due to a generally conical shape of the ink discharge from the print-heads).

In general, vertical position of printed dot or dots is achieved by controlling the timing of the signal applied to the nozzle depositing the ink which produces the dot. As such, adjusting the vertical position of a print head may be achieved either by mechanically adjusting the vertical position of the print-head, or by adjusting the timing of the signal applied to nozzles in the print-head. Also, horizontal position of printed dot or dots is achieved by controlling a deflection signal applied to the nozzle depositing the ink which produces the dot. As such, adjusting the horizontal position of a print head may be achieved either by mechanically adjusting the horizontal position of the print-head, or by adjusting the deflection signals applied to nozzles in the print-head. Adjusting the rotation angle of printed dot or dots may be achieved either by mechanically rotating the print-head printing the dots or by adjusting both the timing signals and the deflection signals applied to nozzles in the print-head.

Figure 3A:
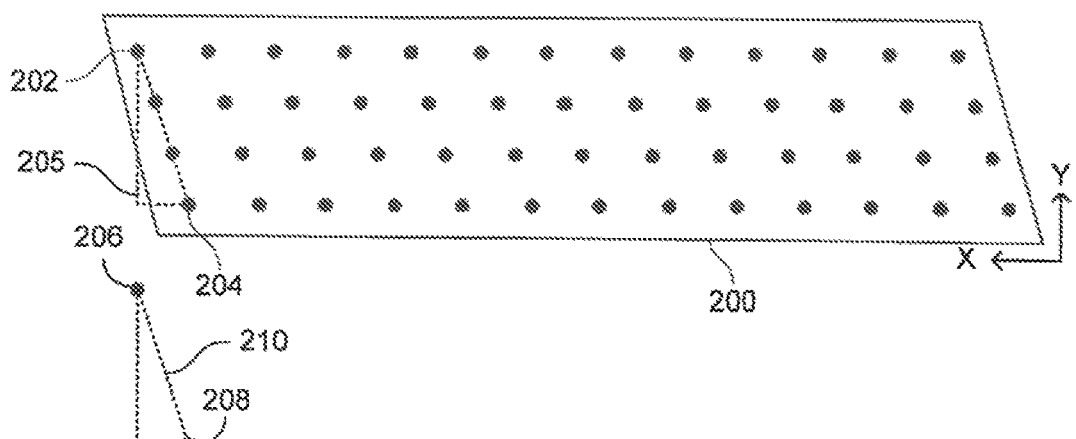
FIGS. 3A-3F are schematic illustrations of a method for determining the print rotation error of a print-head, in accordance with a further embodiment of the disclosed technique.
Figure 3B:
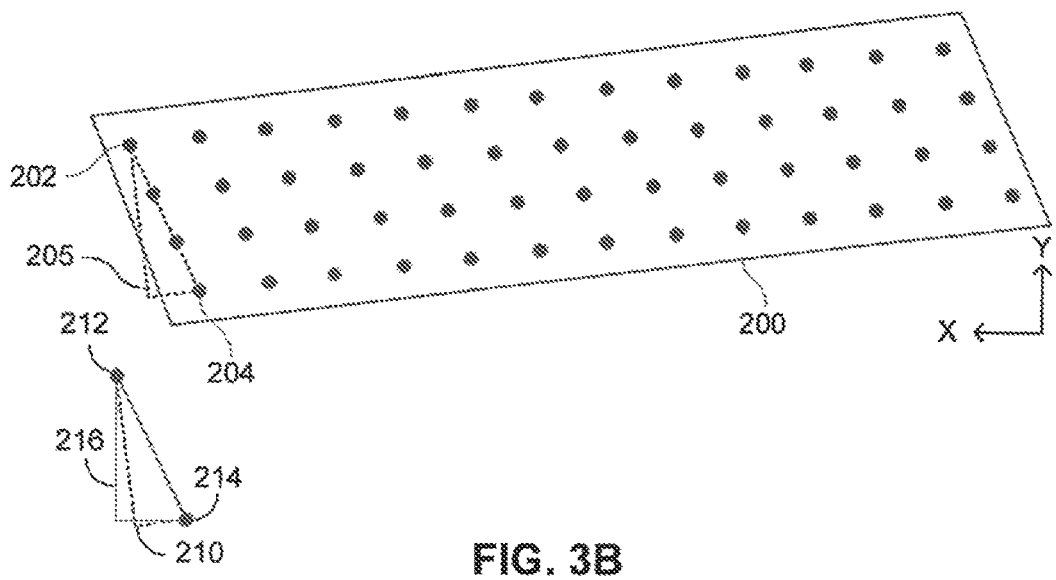

Reference is now made to FIGS. 3A-3F which are schematic illustrations for a method of determining the print rotation error of a print-head 200, in accordance with a further embodiment of the disclosed technique. The rotation angle of a print-head is also referred to herein as 'slope'. Printed-head 200 is similar in construction to either one of print-heads described above. With reference to FIG. 3A, print-head 200 is angularly aligned. The term 'angularly aligned' relates herein to a print-head with nozzle lines (e.g., nozzle lines $156_{C21}$, $156_{C22}$, $156_{C23}$ and $156_{C24}$ in FIG. 2A or nozzle lines $166_{C21}$, $166_{C22}$, $166_{C23}$ and $166_{C24}$ In FIG. 2B) parallel and/or perpendicular to the cross-print direction (i.e., the X axis). In printed-head 200, nozzle 202 and nozzle 204 define a triangle 205. Thus, dot 206 and dot 208, printed by nozzle 202 and nozzle 204 respectively, define a triangle 210, similar to triangle 205. With reference to FIG. 3B, print-head 200 is rotated in the counterclockwise direction relative to the X axis. Thus, dot 212 and dot 214, printed by nozzle 202 and nozzle 204 respectively, define a triangle 216, which is different from triangle 210.

Figure 3C:
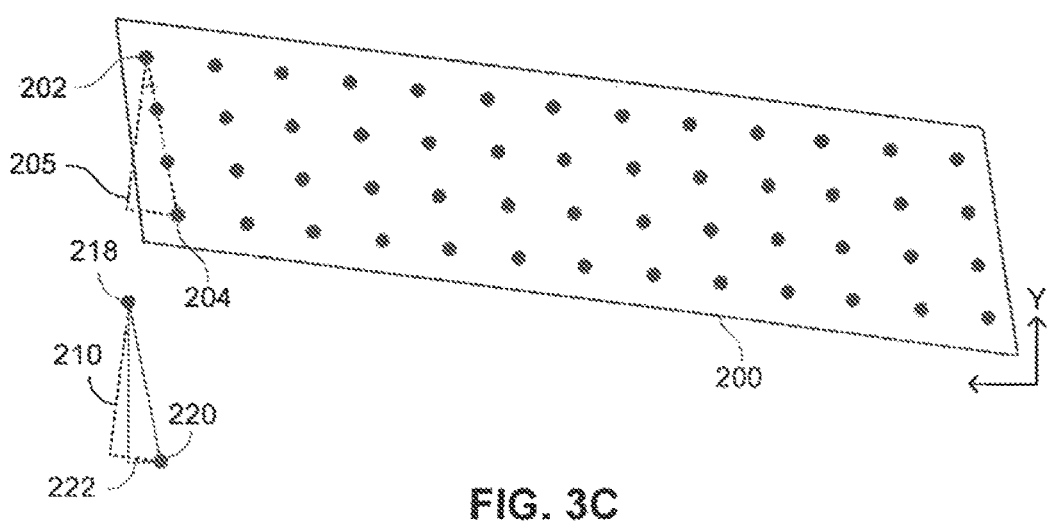

With reference to FIG. 3C, print-head 200 is rotated in the clockwise direction relative to the X axis. Thus, dot 218 and dot 220, printed by nozzle 202 and nozzle 204 respectively, define a triangle 222, which is different from triangle 210.

Figure 3F:
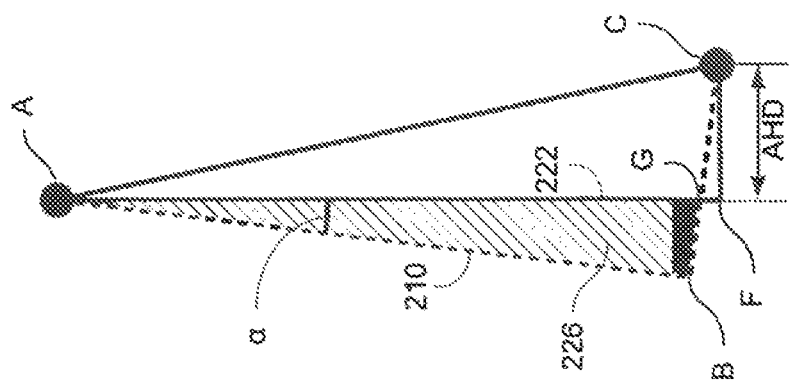
Figure 3E:
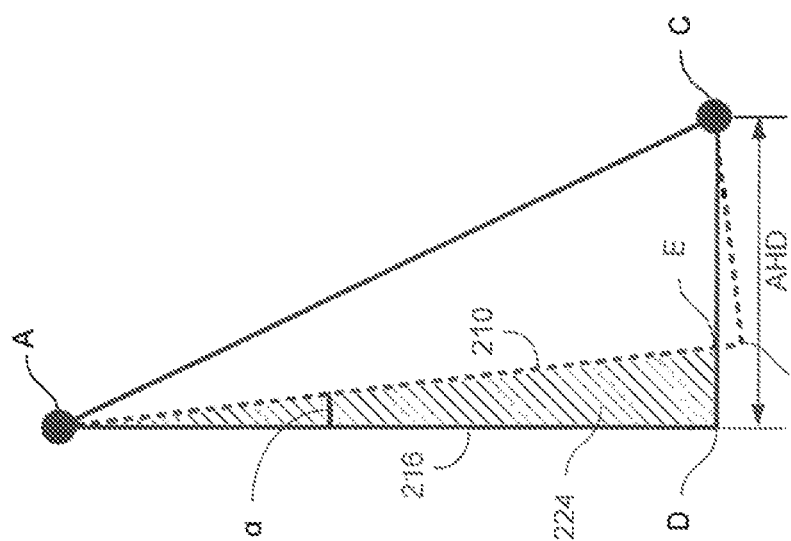
Figure 3D:
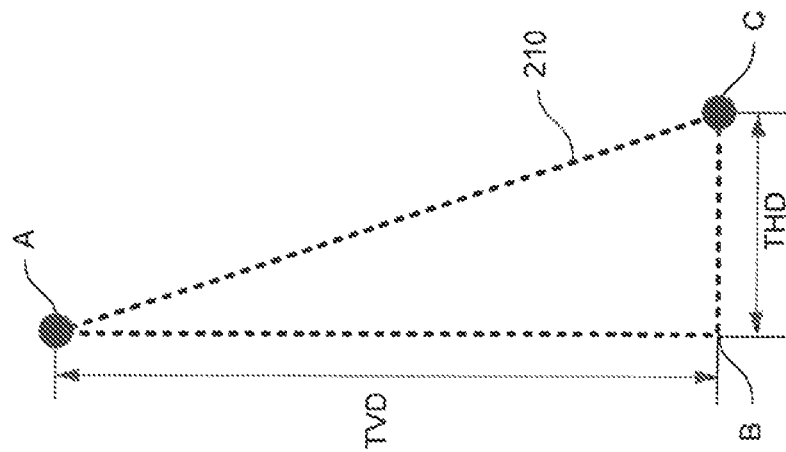

With reference to FIGS. 3D-3F, triangle 210, is a right angle triangle defined by the points ABC, where the points A and B correspond to nozzles 202 and 204. The height of triangle 210 is the Theoretical Vertical Distance (TVD) over the Y axis between nozzle 202 and nozzle 204. The width of triangle 210 is the Theoretical Horizontal Distance (THD) along the X axis between nozzle 202 and nozzle 204. The TVD and the THD are determined from known mechanical design parameters of the print-head. With reference to FIGS. 3E, triangle 210 and triangle 216 define a triangle 224 (triangle DAE), where the angle between the heights of triangle 210 and triangle 216 is denoted α (i.e., angle ∠DAE). Similarly, triangle 210 and triangle 216 define a triangle 226 (triangle BAG), where the angle between the heights of triangle 210 and triangle 222 is also denoted α (i.e., angle ∠BAG). The angle α is the rotation angle (i.e., the slope) of print-head 200. The angle α is estimated from the TVD the THD and the Actual Horizontal Distance (AHD) between the two dots. For example, the angle α is determined according to the following:

$$\sin\alpha = \frac{THD - AHD}{TVD} \quad (1)$$

For small value of α, sin α≈α. Thus, the rotation angle of print-head 200 can be estimated according to the following:

$$\alpha \cong \frac{THD - AHD}{TVD} \quad (1)$$

In view of the above, the rotation angle of a print-head which includes a plurality nozzle lines, may be determined by printing two dots corresponding to two nozzles from two different nozzle lines in the print-head, where the theoretical vertical distance and the theoretical horizontal distance between the two printing nozzles is known. The actual horizontal distance between the two dots is measured from an image of the two dots (e.g., determined by processor 106 in FIG. 1 from an image of Target-A acquired by imager 104). When THD-AHD is positive, the rotation angle is referred to as a positive angle. When THD-AHD is negative, the rotation angle is referred to as a negative angle. The method described above for determining the rotation angle of a print-head relies only on known parameters of the print-head. As such, this method is invariant to extrinsic influences such as camera rotation, camera sensors misscalibration (e.g., when more than one sensor is employed by the camera) and the like.

Reference is now made to FIGS. 4 A-4 E, which are schematic illustrations of a method for aligning a row of print-heads 250, operative in accordance with another embodiment of the disclosed technique. Print-head row 250 prints, for example, the color black, and includes a plurality of print-heads 254 K1, 254 K2, . . . , 254 NK. Each print-head includes a plurality of nozzle lines. In print-head row 250 each one print-heads 254 K1, 254 K2, . . . , 254 CK includes, for example, 4 nozzle lines 256 K21, 256 K22, 256 K23 and 256 K24. Each nozzle line includes a plurality of nozzles such as nozzle 258. The nozzle lines are oriented in the cross-print (X) direction. In other words, the nozzle lines are oriented perpendicular to the direction of motion (Y) of the substrate. Also the nozzle lines are shifted one with respect to other in the cross-print (X) direction. Herein, when print-heads such as print-heads 254 K1, 254 K2, . . . , 254 NK are aligned one with respect to the other, these print-heads shall be referred to as being in a "nominal position". The term "position" relates herein to the location and orientation of the print-heads.

Figure 4A:
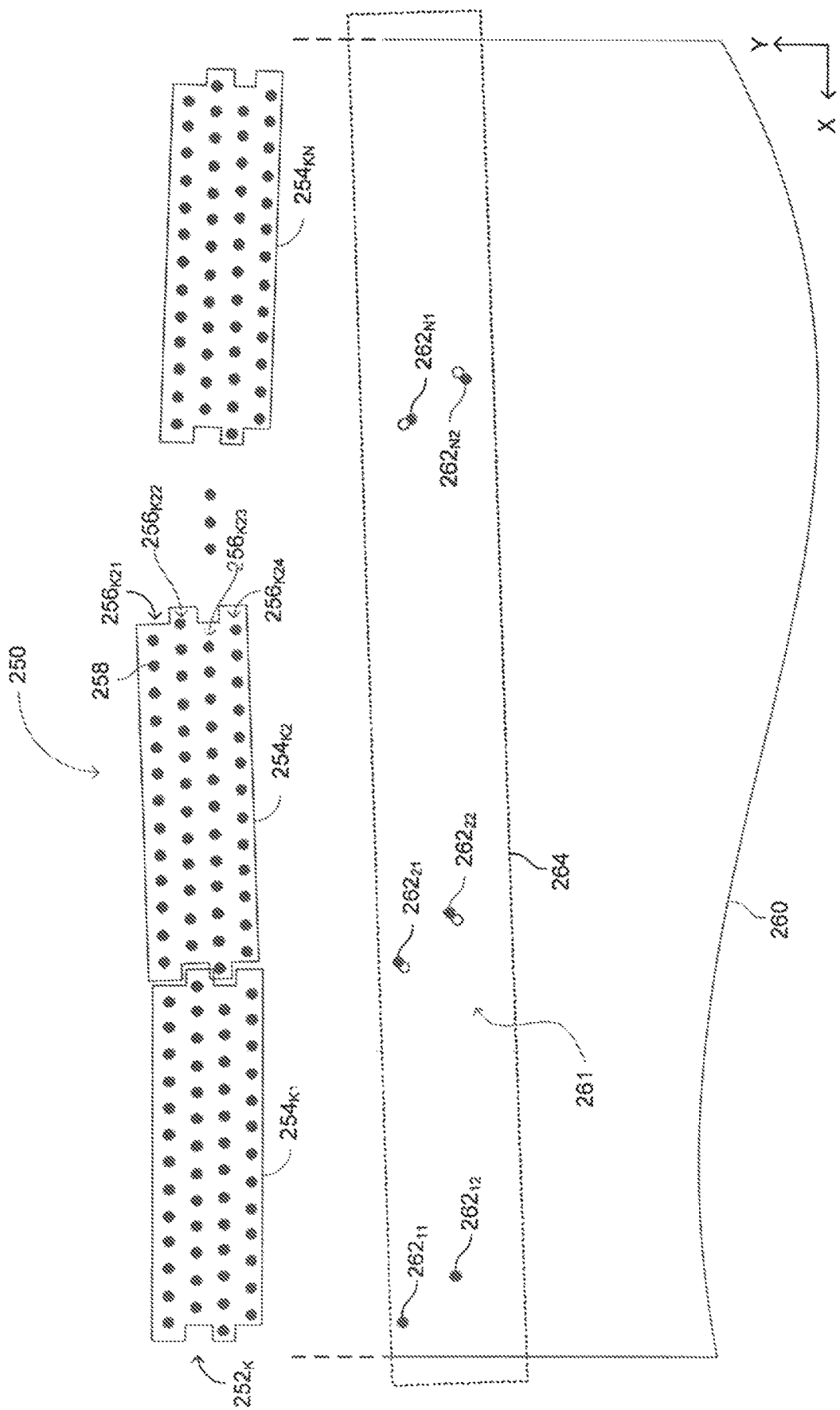
FIGS. 4A-4E are schematic illustrations of a method for aligning a row of print-heads, operative in accordance with another embodiment of the disclosed technique.

Print-head row 250 prints a pattern which includes a print-head pattern for each one of print-heads $254_{K1}$, $254_{K2}$, . . . , $254_{NK}$. Print-head pattern includes at least two dots printed by each one of print-heads $254_{K1}$, $254_{K2}$, . . . , $254_{NK}$, where two of the at least two nozzles are located at different nozzle lines in the respective print-head. Also the theoretical vertical distance and the theoretical horizontal distance between the two printing nozzles are known. In the example brought forth in FIGS. 4A-4E, the upper left nozzle in the first row and the third nozzle from the left in the second row printed a respective dot. Print-head $254_{K1}$ printed dots $262_{11}$ and $262_{12}$, print-head $254_{K2}$ printed dots $262_{21}$ and $262_{22}$, print-head $254_{KN}$ printed dots $262_{N1}$ and $262_{N2}$. Printed dots $262_{11}$, $262_{12}$, $262_{21}$, $262_{22}$, $262_{N1}$ and $262_{N2}$ form at least a part of a first alignment pattern employed for print-head alignment referred to herein as "Target-A" 261. In general, Target-A 261 includes, for each print-head in each row of print-heads, a print-head pattern (i.e., a print-head target-A) which includes at least two dots, where at least two dots in the print-head target-A correspond to respective at least two nozzles from two different nozzle lines in the respective print-head, and where the theoretical vertical distance and the theoretical horizontal distance between two of the at least two printing nozzles is known. Target-A is further elaborated below. In FIG. 4A, print-heads $254_{K2}$ and $254_{KN}$ are depicted as rotated about their respective axis, as well as shifted in the X and Y directions one with respect to the other and with respect to print-head $254_{K1}$. Consequently, the location dots $262_{21}$ and $262_{22}$ printed by print-head $254_{K2}$ and of dots $262_{N1}$ and $262_{N2}$ printed by print-head $254_{KN}$ differ from their expected location (i.e., when all printed-heads in print-head row 250 are aligned). In FIG. 4A, the actual dots printed by each one of print-heads $254_{K1}$, $254_{K2}$ and $254_{KN}$ is designated by filled circles and the expected location of these dots is designated by empty circles.

Figure 4B:
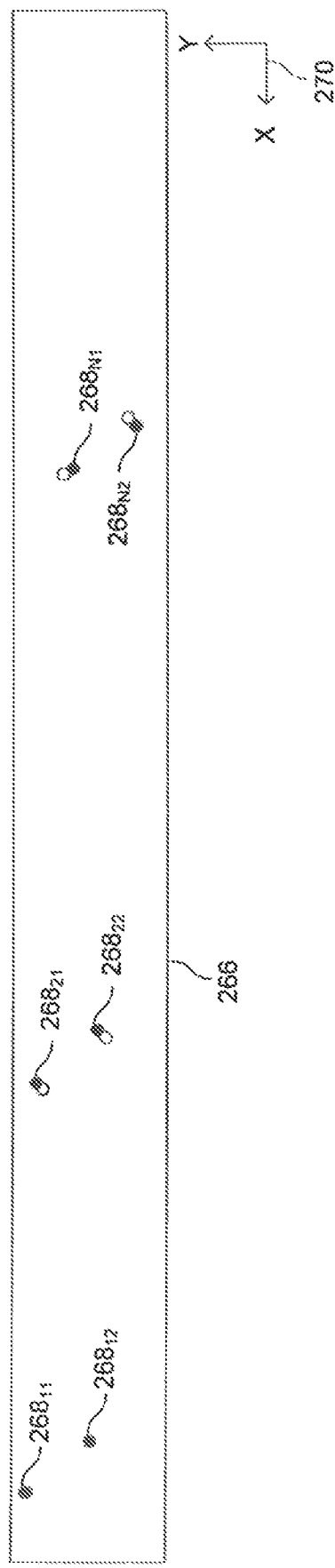

Once print-heads $254_{K1}$, $254_{K2}$, . . . , $254_{CK}$ print the respective print-heads patterns thereof, an imager 264 (similar to imager 104-FIG. 1) acquires an image 266 (FIG. 4B) of Target-A 261. Image 266 includes respective representation of Target-A 261 and thus of the print-heads patterns. In FIG. 4B, image 266 includes dot representations $268_{11}$, $268_{12}$, $268_{21}$, $268_{22}$, $268_{N1}$ and $268_{N2}$ of printed dots $262_{11}$, $262_{12}$, $262_{21}$, $262_{22}$, $262_{N1}$ and $262_{N2}$. Imager 264 may also be rotated relative to the nominal orientation of the print print-heads $254_{K1}$, $254_{K2}$, . . . , $254_{CK}$. Image 266 is associated with a respective coordinate system 270. Coordinate system 270 may have sub-pixel resolution to a determined degree.

The rotation angle of print-head $254_{K1}$ is determined as described above in conjunction with FIG. 3A-3F, employing the respective dot representations $268_{11}$ and $268_{12}$ and their respective locations in coordinate system 270. Similarly, the rotation angle of print-head $254_{K2}$ Is determined employing the respective dot representations $268_{21}$ and $268_{22}$ and their respective locations in coordinate system 270, and the rotation angle of print-head $254_{KN}$ is determined employing the respective dot representations $268_{N1}$ and $268_{N2}$ and their respective locations in coordinate system 270, also as described above in conjunction with FIG. 3A-3F.

Figure 4C:
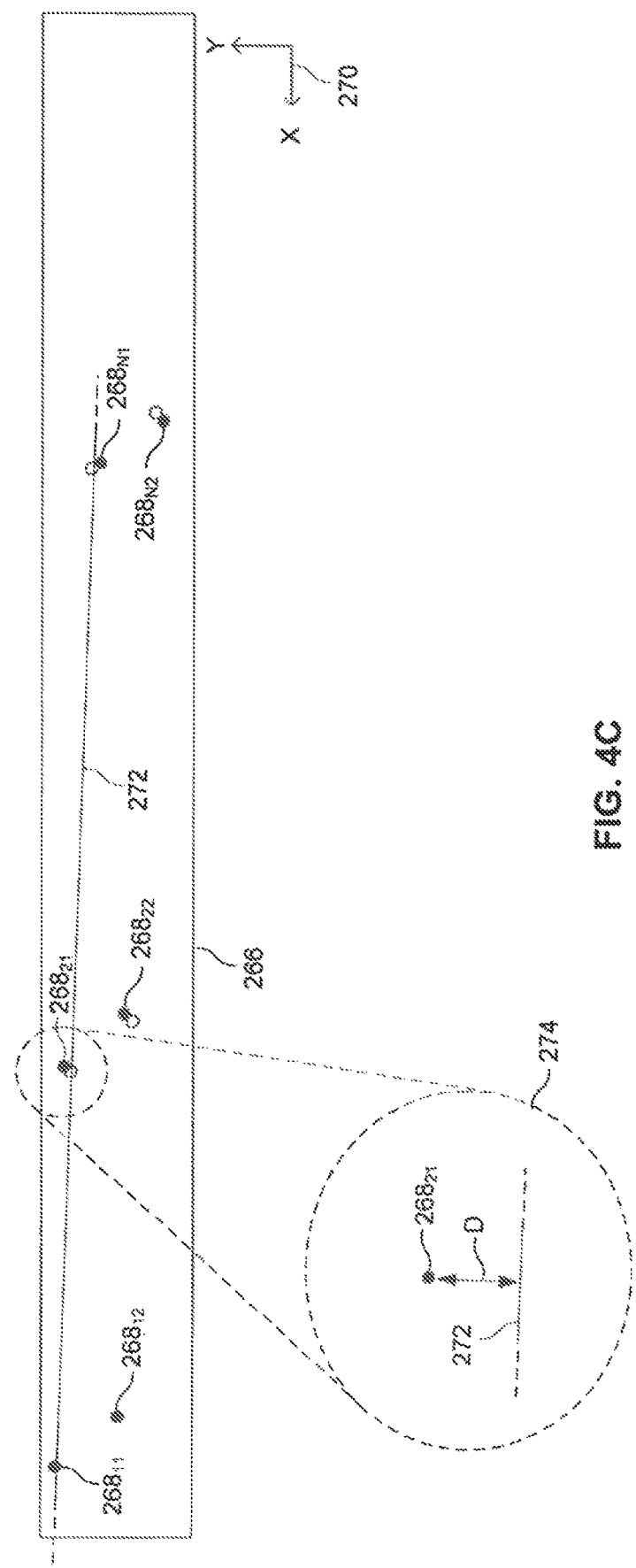
Figure 4D:
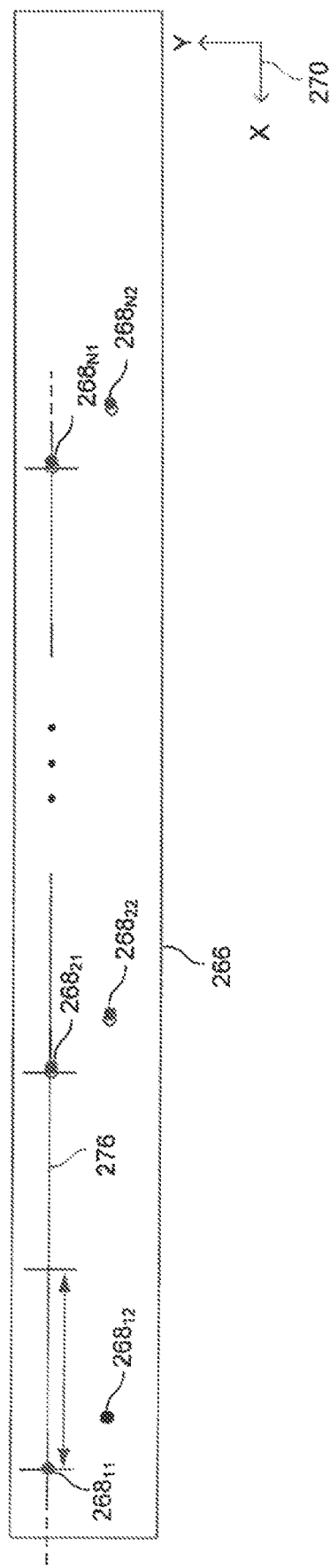
Figure 4E:
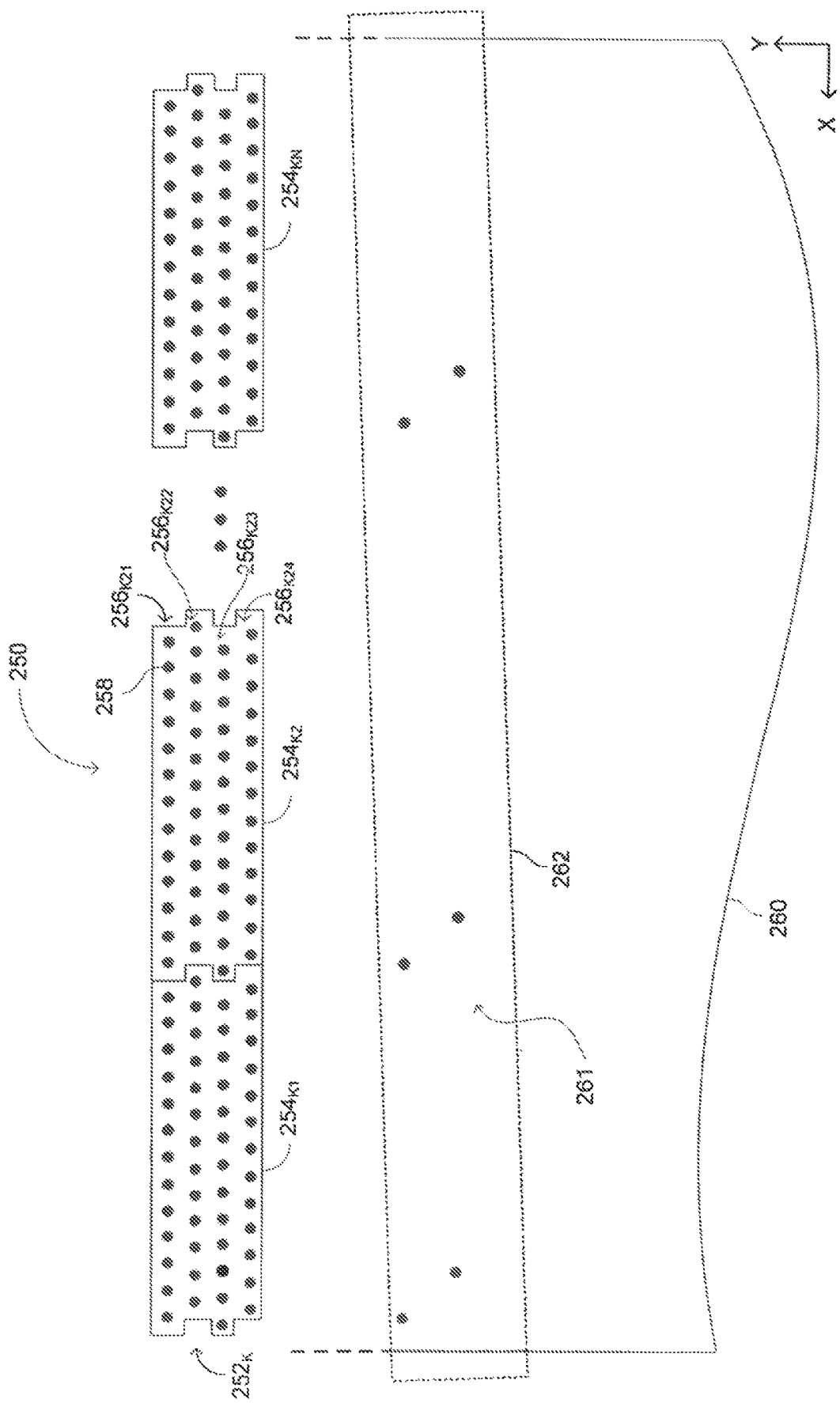

With reference to FIG. 4C, to determine the vertical displacement (i.e., in the Y direction) between print-heads $254_{K1}$, $254_{K2}$, . . . , $254_{CK}$, a line 272 of best fit between the dots representation corresponding to the dots printed by the same nozzle line in each of print-heads $254_{K1}$, $254_{K2}$, . . . , $254_{CK}$ (e.g., line 272 is determined by processor 106-FIG. 1). In the example brought forth in FIGS. 4A-4E line 272 is fitted between dot representation $268_{11}$ (printed by the first line in print-head $254_{K1}$), dot representation $268_{21}$ (printed by the first line in print-head $254_{K2}$), and dot representation $268_{N1}$ (printed by the first line in print-head $254_{KN}$). Due to the rotation of the imager 262, line 272 may be rotated in the coordinate system 270 associated with imager 264. The vertical displacement of print-heads $254_{K1}$, $254_{K2}$, . . . , $254_{NK}$ is determined according to the distance between the respective dot representation of each of print-heads $254_{K1}$, $254_{K2}$, . . . , $254_{CK}$ according to which the line 272 was estimated, and line 272. The vertical displacement of print-head $254_{K1}$ is determined according to the distance between dot representation $268_{11}$ and line 272. The vertical displacement of print-head $254_{K2}$ Is determined according to the distance between dot representation $268_{21}$ and line 272, this distance is demarked 'D' in enlargement circle 274, exemplifying vertical displacement determination. The vertical displacement of print-head $254_{KN}$ is determined according to the distance between dot representation $268_{N1}$ and line 272. Line 272 may be anchored to either one of dot representations $268_{11}$, $268_{21}$ or $268_{N1}$, for example, when one of print-heads $254_{K1}$, $254_{K2}$, . . . , $254_{NK}$ is a reference print head. Also, the rotation of the camera can be determined from angle of line 272 in image 266. Also, once line 272 is determined, line 272 and dot representations $268_{11}$, $268_{21}$ or $268_{N1}$ may be aligned coordinate system 270 of image 266. With reference to FIG. 4D, to determine the horizontal displacement (i.e., In the X direction) between print-heads $254_{K1}$, $254_{K2}$, . . . , $254_{NK}$, a local grid 276 is determined between the respective dot printed by the same nozzle line in each of print-heads $254_{K1}$, $254_{K2}$, . . . , $254_{NK}$. Local grid 276 is determined between dot representations $268_{11}$, $268_{21}$ or $268_{N1}$ of each of print-heads $254_{K1}$, $254_{K2}$, . . . , $254_{NK}$ (e.g., local grid 276 is determined by processor 106-FIG. 1). To determine local grid 276, the spacing (i.e., the relative location) between at least a selected group of dot representations $268_{11}$, $268_{21}$, . . . , $268_{N1}$ is determined. Thereafter, the grid spacing (i.e., the distance between the grid points) that best fits the spacing between the dot representations $268_{11}$, $268_{21}$, . . . , $268_{N1}$ is determined, for example, according to the least square criterion. The start of the grid may be anchored, for example, at a determined distance before the first dot representation in the selected group of dot representations (e.g., at half the expected distance between the first nozzle mark in the group and the preceding nozzle mark), the coefficients of the equations:

$$y = ax + b \qquad (1)$$

are determined where a is the grid spacing and b is the anchor point before the dot representation in the group. Thereafter, each one of print-heads $254_{K1}$, $254_{K2}$, . . . , $254_{NK}$ Is horizontally aligned with reference grid 276 according to the expected distance between dot representations $268_{11}$, $268_{21}$, . . . , $268_{N1}$ (e.g., the grid point closest to this expected distance).

The term 'distance' herein refers to the selected metric employed to determine the spacing, which can be measured, for example, meters, millimeters or pixel units (i.e., not necessarily in whole pixels). Employing a local reference grid between adjacent print head targets eliminate the accumulation of errors when aligning the print head target relative to a single reference target.

Also, each print-head target-A may be printed by different by different nozzles in the respective print-heads. However, to align the print-heads in a row of print-heads, one with respect to the other, the print-head target-A's should be printed by the same nozzles in each print-head. Alternatively, when print-head target-A's are printed by different nozzles the rotation angle of the camera, relative to the X and Y directions, should be known. When the rotation angle of the camera relative to the X and Y directions is known, the Y and X direction in the acquired image are also known and the print-head target—As may be shifted in the correct direction in the image coordinate system according to the known distances between the nozzle lines.

The method described above in conjunction with FIGS. 4A-4E exemplified the alignment of print-heads in a single print-head row, one with respect to the other and the rotation of each print-head employing Target-A. In general, according to the disclosed technique, Target-A is employed to align the angle of each print-head in the array of print heads, as well as to align the print-heads in a reference row of print-heads in the vertical and horizontal directions relative to each other. In some cases, when the location of the rotation axis of each of the print-heads is not known, Target-A is printed twice, once to align the rotation angle and once to align the vertical and horizontal displacement of at least the reference print-head row. Once the rotation of the print-heads have been aligned, and at least the print-heads in a reference row of print-heads have been aligned one with respect to the other in the X and Y direction, the print-head rows need to be aligned one with respect to the other. To that end, the print-head rows, other than the reference row of print-heads, are aligned with respect to the reference row of print-heads. To align the print-head rows one with respect to the other, the printing press prints a pattern referred to herein as Target-B.

Reference is now made to FIGS. 5A, 5B, 5C and 5D, which are schematic illustrations of a method for aligning an exemplary print-head array, generally referenced 300, operative in accordance with a further embodiment of the disclosed technique. Print-head array 300 include a plurality of print-head rows $302_C$, $302_M$ and $302_Y$ printing the colors Cyan, Magenta and Yellow respectively. Each one of print-head rows $302_C$, $302_M$ and $302_Y$ includes an array of nozzles. The array of nozzles includes a plurality of print-heads, each print-head printing the respective color of the respective row. Print-head row $302_C$ includes print-heads $303_{C1}$, $303_{C2}$, $303_{C3}$, . . . , $303_{CN-1}$, $303_{CN}$. Print-head row $302_M$ includes print-heads $303_{M1}$, $303_{M2}$, $303_{M3}$, . . . , $303_{MN-1}$, $303_{MN}$. Print-head row $302_Y$ incudes print-heads $303_{Y1}$, $303_{Y2}$, $303_{Y3}$, . . . , $303_{YN-1}$, $303_{YN}$. Each print-head includes a plurality of nozzles lines. Each nozzles line includes a plurality of nozzle. The nozzle lines are shifted one with respect to other in the cross-print (X) direction. Print-head array 300 prints a Target-A 305 on a substrate 304. As mentioned above Target-A includes, for each print-head in each row of print-heads, at least two dots, where at least two dots correspond to respective at least two nozzles from two different nozzle lines in the respective print-head. The theoretical vertical distance and the theoretical horizontal distance between the at least two nozzles from the two different lines is known.

Figure 5A:
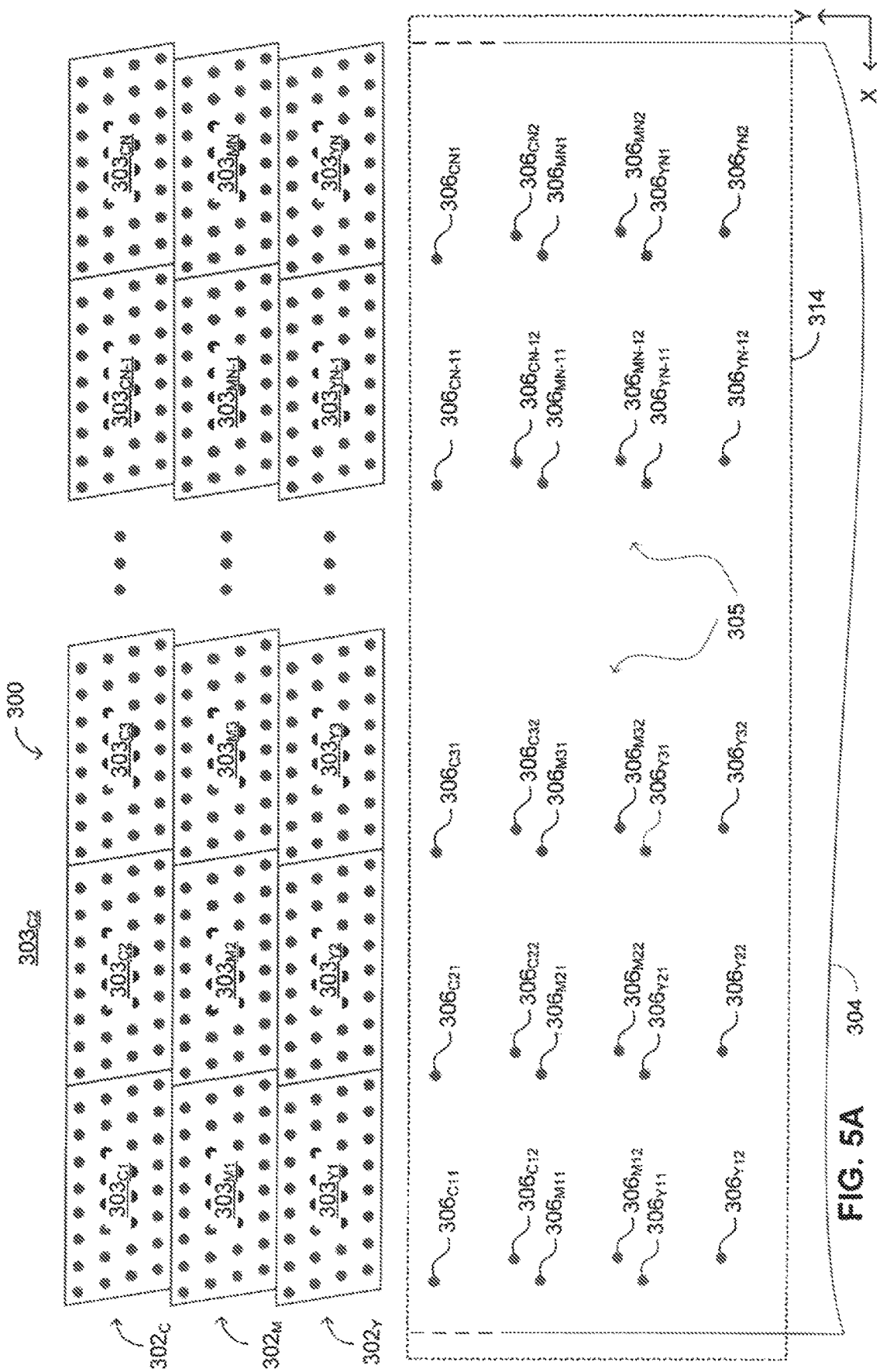
FIGS. 5A, 5B, 5C and 5D are schematic illustrations of a method for aligning an exemplary print-head array operative in accordance with a further embodiment of the disclosed technique.

In the example brought forth in FIG. 5A, each one of print-heads $303_{C1}$, $303_{C2}$, $303_{C3}$, . . . , $303_{CN-1}$, $303_{CN}$, print-heads $303_{M1}$, $303_{M2}$, $303_{M3}$, . . . , $303_{MN-1}$, $303_{MN}$ and print heads $303_{Y1}$, $303_{Y2}$, $303_{Y3}$, . . . , $303_{YN-1}$, $303_{YN}$ prints a respective print-head pattern. Print-head $303_{C1}$ prints dots $306_{C11}$ and $306_{C12}$, print-head $303_{C2}$ prints dots $306_{C21}$ and $306_{C22}$, print-head $303_{C3}$ prints dots $306_{C31}$ and $306_{C32}$, print-head $303_{CN-1}$ prints dots $306_{CN-11}$ and $306_{CN-12}$ and print-head $303_{CN}$ prints dots $306_{CN1}$ and $306_{CN2}$. Each one of print-head $303_{C1}$, print-head $303_{C2}$, print-head $303_{C3}$, print-head $303_{CN-1}$ and print-head $303_{CN}$ print the dots associated therewith employing the same nozzles in the respective array of nozzles (e.g., the first nozzle in the first line and the fifth nozzle in the third line the second nozzle in the second line and the last nozzle in the third line). Also, dots $306_{C11}$ and $306_{C12}$ are printed by two different lines in the array of nozzles of printed-head $303_{C1}$. Similarly, dots $306_{C21}$ and $306_{C12}$ are printed by two different lines in the array of nozzles of printed-head $303_{C2}$, dots $306_{C31}$ and $306_{C32}$ are printed by two different lines in the array of nozzles of printed-head $303_{C3}$, dots $306_{CN-11}$ and $306_{CN-12}$ are printed by two different lines in the array of nozzles of printed-head $303_{CN-1}$ and dots $306_{CN1}$ and $306_{CN2}$ are printed by two different lines in the array of nozzles of printed-head $303_{CN}$. The theoretical vertical distance and the theoretical horizontal distance between the nozzle printing dots $306_{C11}$ and $306_{C12}$ is known. Similarly the theoretical vertical distance and the theoretical horizontal distance between the nozzle printing dots $306_{C21}$ and $306_{C22}$, between the nozzle printing dots $306_{C31}$ and $306_{C32}$, between the nozzle printing dots $306_{CN-11}$ and $306_{CN-12}$ and the theoretical vertical distance and the theoretical horizontal distance between the nozzle printing dots $306_{CN1}$ and $306_{CN2}$ are also known (e.g., from the design specification of the printing press). Similarly to print-heads $303_{C1}$, $303_{C2}$, $303_{C3}$, . . . , $303_{CN-1}$, $303_{CN}$, print-head $303_{M1}$ prints dots $306_{M11}$ and $306_{M12}$, print-head $303_{M2}$ prints dots $306_{M21}$ and $306_{M22}$, print-head $303_{M3}$ prints dots $306_{M31}$ and $306_{M32}$, print-head $303_{MN-1}$ prints dots $306_{MN-11}$ and $306_{MN-12}$ and print-head $303_{MN}$ prints dots $306_{MN1}$ and $306_{MN2}$. Also print-head $303_{Y1}$ prints dots $306_{Y11}$ and $306_{Y12}$, print-head $303_{Y2}$ prints dots $306_{Y21}$ and $306_{Y22}$, print-head $303_{Y3}$ prints dots $306_{Y3}$, and $306_{Y32}$, print-head $303_{YN1}$ prints dots $306_{YN-11}$ and $306_{YN-12}$ and print-head $303_{YN}$ prints dots $306_{YN1}$ and $306_{YN2}$.

Dots $306_{C11}$, $306_{C12}$, $306_{C21}$ $306_{C22}$, $306_{C31}$ $306_{C32}$, . . . , $306_{CN-21}$ $306_{CN-12}$, $306_{CN1}$ and $306_{CN2}$, dots $306_{M11}$, $306_{M12}$, $306_{M21}$ $306_{M22}$, $306_{M31}$ $306_{M32}$, . . . , $306_{MN-21}$ $306_{MN-12}$, $306_{MN1}$ and $306_{MN2}$ and dots $306_{Y11}$, $306_{Y12}$, $306_{Y21}$ $306_{Y22}$, $306_{Y31}$ $306_{Y32}$, . . . , $306_{YN-21}$ $306_{YN-12}$, $306_{YN1}$ and $306_{YN2}$ define Target-A. Dots $306_{C11}$, $306_{C12}$, $306_{C21}$ $306_{C22}$, $306_{C31}$ $306_{C32}$, . . . , $306_{CN-21}$ $306_{CN-12}$, $306_{CN1}$ and $306_{CN2}$ define cyan target-A, dots $306_{M11}$, $306_{M12}$, $306_{M21}$ $306_{M22}$, $306_{M31}$ $306_{M32}$, . . . , $306_{MN-21}$ $306_{MN-12}$, $306_{MN1}$ and $306_{MN2}$ define magenta target-A and dots $306_{Y11}$, $306_{Y12}$, $306_{Y21}$ $306_{Y22}$, $306_{Y31}$ $306_{Y32}$, . . . , $306_{YN-21}$ $306_{YN-12}$, $306_{YN1}$ and $306_{YN2}$ define yellow target-A.

In the example brought forth in FIG. 5A, print-head row $302_M$, printing the magenta color is selected as the reference print-head row. An imager 314 acquires an image of Target-A. The representation of magenta target-A in the acquired image is employed determine the rotation of print-head $303_{M1}$, $303_{M2}$, . . . , $303_{MN}$ (i.e., as described above in conjunction with FIGS. 3A-3F and 4A-4E) and to align print-heads $303_{M1}$, $303_{M2}$, . . . , $303_{MN}$ in the X and Y directions one with respect to the other (i.e., as described above in conjunction with FIGS. 4A-4E). The representation of cyan target-A in the acquired image is employed determine the rotation of print-head $303_{C1}$, $303_{C2}$, . . . , $303_{CN}$ (i.e., as described above in conjunction with FIGS. 3A-3F and 4A-4E). The representation of cyan target-A is optionally employed to align print-heads $303_{C1}$, $303_{C2}$, . . . , $303_{CN}$ in the X and Y directions one with respect to the other (i.e., as described above in conjunction with FIGS. 4A-4E). The representation of yellow target-A in the acquired image is employed determine the rotation of print-head $303_{Y1}$, $303_{Y2}$, . . . , $303_{YN}$ (i.e., as described above in conjunction with FIGS. 3A-3F and 4A-4E). The representation of yellow target-A is optionally employed to align print-heads $303_{Y1}$, $303_{Y2}$, . . . , $303_{YN}$ in the X and Y directions one with respect to the other (i.e., as described above in conjunction with FIGS. 4A-4E).

It is noted that the nozzles printing the dots in one row of print-heads need not be the same nozzles printing the dots in another row of print-heads. For example, nozzles printing the dots in cyan target-A need not be the same as the nozzles printing the dots in yellow target-A. Also, Target-A may be employed to align the rows one with respect to the other, employing the known spatial relationship between the nozzles printing the dots. However, employing Target-A to align the rows of print-heads one with respect to the other may be subject to cumulative errors.

As mentioned above, once the rotation of the print-heads have been aligned, and at least the print-heads in a reference row of print-heads have been aligned one with respect to the other in the X and Y direction, the print-head rows need to be aligned one with respect to the other. To that end, the print-head rows, other than the reference row of print-heads, are aligned with respect to the reference row of print-heads. To align the print-head rows one with respect to the other, the printing press prints a pattern referred to herein as Target-B.

Target-B includes a plurality of color print-head target-B's and a plurality of reference print-head target-B's. Each reference print-head target-B is printed by a respective reference print-head of a reference row. Each color print-head target-B is printed by a respective color print-head in a row other than the reference row. Each color print-head target-B is associated with a first reference print-head target-B, a second reference print-head target-B and optionally a third reference print-head target-B. The first reference print-head target-B and the second reference print-head target-B are printed above and below (i.e., in the vertical direction) the respective color print-head target-B. The first reference print-head target-B, the second reference print-head target-B and the color print-head target-B are printed by the same at least one nozzle in the array of nozzles of the respective print-head. The third reference print-head target-B is printed on the left or right side (i.e., adjacent in the horizontal direction) of said color print-head target-B. The third reference print-head target-B, is printed by an at least one nozzle different from the at least one nozzle printing the color print-head target-B, but located on the same line of nozzles in the array of nozzles of the respective print-heads. The color print-head target-B, the first reference print-head target-B, the second reference print-head target-B and the third reference print-head target-B are printed by a respective print-head having the same row location. The side of the third reference print-head target-B alternates between rows other than the reference row. It is noted that a first or a second reference print-head target-B may be a third reference print-head target-B of another color and vice versa. Consequent to the above, each color print-head target-B is surrounded by reference print-head target-B's. Target-B may further include additional reference print-head target-B's.

According to another example, Target-B includes alternating columns of color print-head target-B's and reference print-head target-B's. Thus, each color print-head target-B is associated with a first reference print-head target-B and a second reference print-head target-B printed to the left and the right (i.e., in the horizontal direction) of the respective color print-head target-B. One of the first reference print-head target-B and the second reference print-head target-B, and the color print-head target-B are printed by the same at least one nozzle in the array of nozzles of the respective print-head and by a print-head located at the same row location. The other one of the first reference print-head target-B and the second reference print-head target-B is printed by a print-head at an adjacent row location. The color print-head target-B's in each row of targets relates to a different color.

Figure 5B:
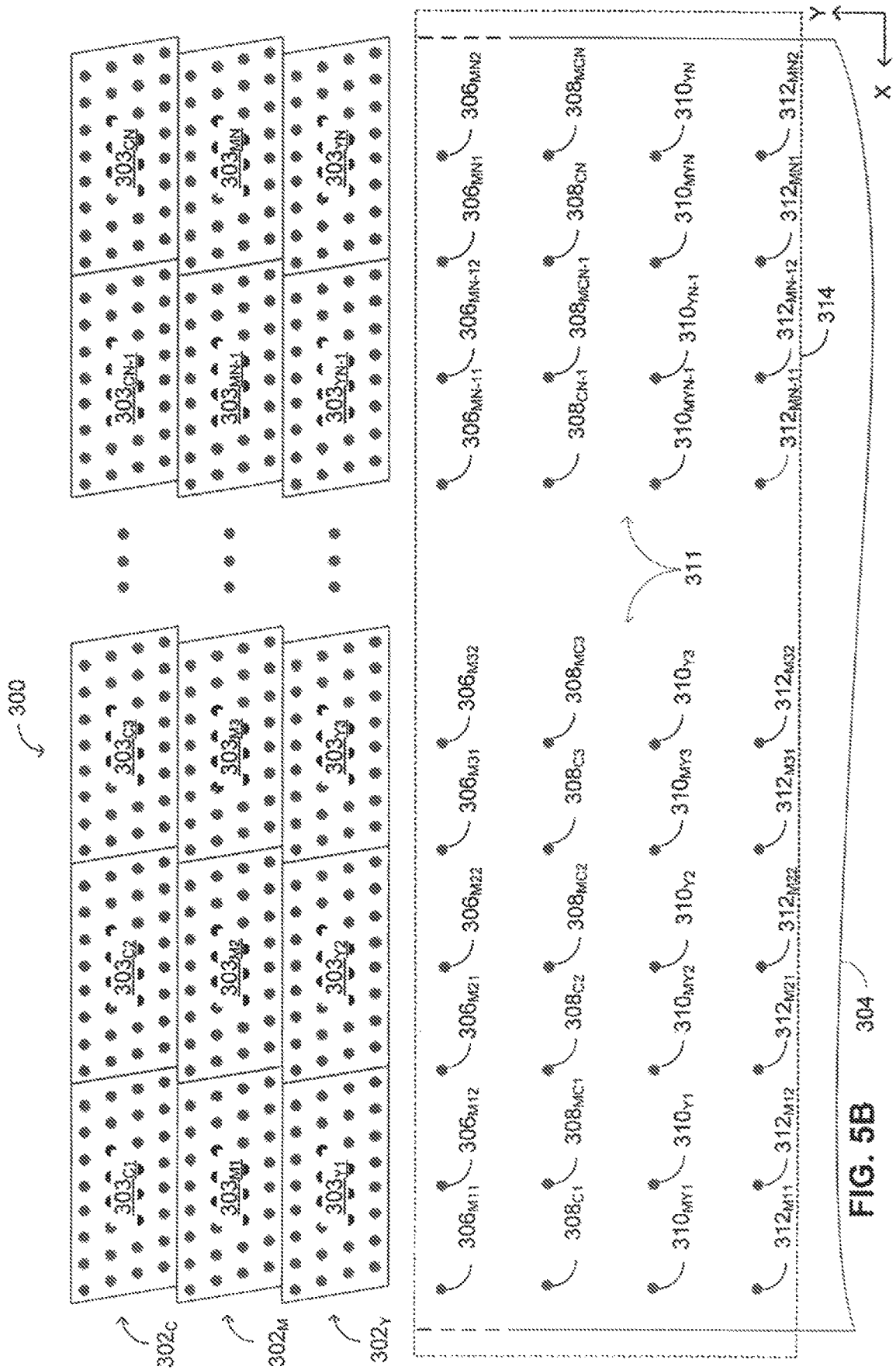
Figure 5C:
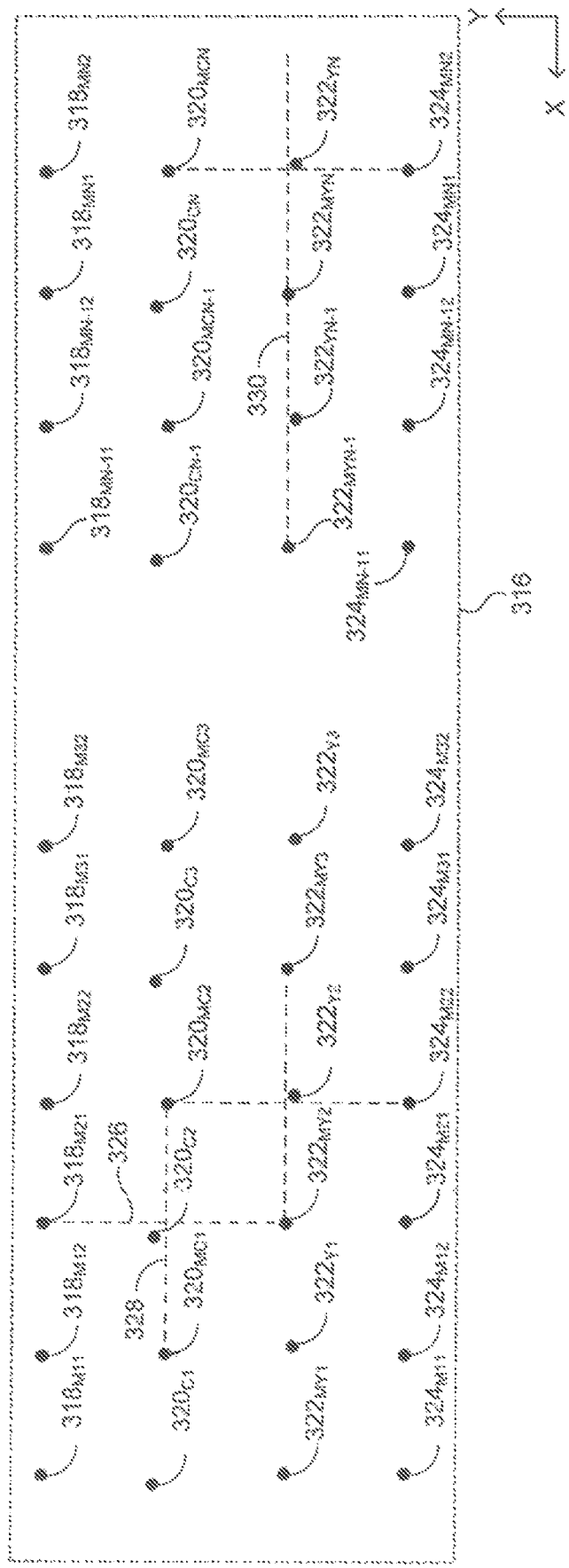
Figure 5D:
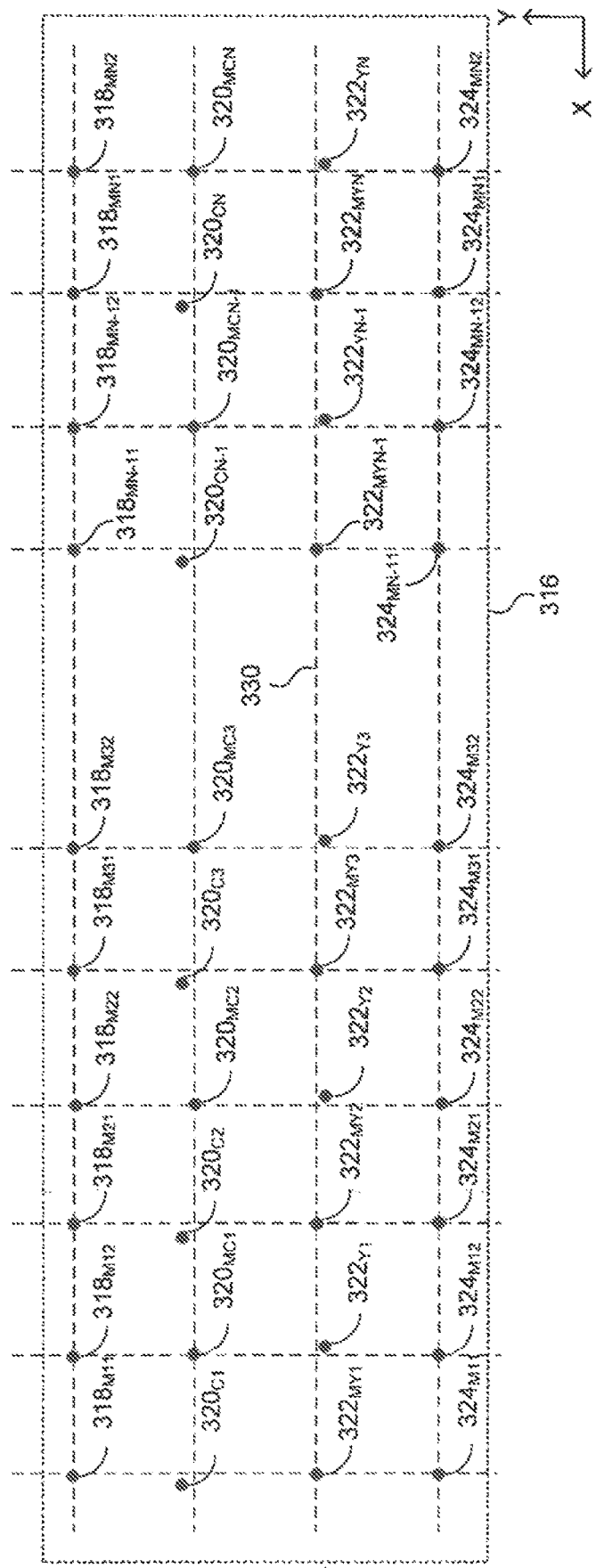

With reference to FIGS. 5B, 5C and 5D, print-head array 300 prints a Target-B 311 on substrate 304. Print-head row $302_M$ prints at least one reference target-B line, which includes a plurality of print-heads targets-B. In FIGS. 5B and 5C, a print-head target-B is exemplified as a dot. Print-head row $302_M$ prints dots $306_{M11}$, $306_{M12}$ $306_{M21}$, $306_{M22}$, $306_{M31}$, $306_{M32}$, ..., $306_{MN-11}$, $306_{MN-12}$, $306_{MN1}$ and $306_{MN2}$. In the example brought forth in FIGS. 5B and 5C, print-head row $302_M$ another reference target-B line, which includes dots $312_{M11}$, $312_{M11}$ $312_{M21}$, $312_{M22}$, $312_{M31}$, $312_{M32}$, ..., $312_{MN-11}$, $312_{MN-12}$, $312_{MN1}$ and $312_{MN2}$.

Print-head $303_{M1}$ prints dots $306_{M11}$, $306_{M21}$, $312_{M11}$, $312_{M21}$. Print-head $303_{M1}$ prints dots $306_{M11}$ and $312_{M11}$ by a nozzle located in a first nozzle location (e.g., the first nozzle in the first line) in print-head $303_{M1}$, and prints dots $306_{M12}$ and $312_{M12}$ by a nozzle located in a second nozzle location (e.g., the fifth nozzle in the first line) in print-head $303_{M1}$, where the first nozzle location and the second nozzle location a located on the same line of nozzles in the nozzles array of print-head $303_{M1}$. Similarly print-head $303_{M2}$ prints dot $306_{M21}$, dot $306_{M22}$, dot $312_{M21}$ and dots $312_{M22}$, print-head $303_{M3}$ prints dot $306_{M31}$ dot $306_{M32}$, dot $312_{M31}$ and dots $312_{M32}$, print-head $303_{MN-1}$ prints dot $306_{MN-11}$, dot $306_{MN-12}$, dot $312_{MN-12}$ and dot $312_{MN-12}$ and print-head $303_N$ prints dot $306_{MN1}$, dot $306_{MN2}$, dot $312_{MN1}$ and dot $312_{MN2}$.

In the example brought forth in FIGS. 5B-5C, print-head row $302_C$ and print-head row $302_M$ prints the cyan target-B line. Print-head $303_{C1}$ prints dot $308_C$, by a nozzle located in the first nozzle location (the first nozzle in the first line in the example above) in print-head $303_{C1}$, and print-head $303_{M1}$ prints dot $308_{MC1}$ by a nozzle located in a second nozzle location (the fifth nozzle in the first line in the example above) in print-head $303_{M1}$. Similarly print-head $303_{C2}$ prints dot $308_{C2}$ and print-head $303_{M2}$ prints dot $308_{MC2}$, print-head $303_{C3}$ prints dot $308_{C3}$ and print-head $303_{M3}$ prints dot $308_{MC3}$, print-head $303_{CN-1}$ prints dot $308_{CN-1}$ and print-head $303_{MN-1}$ prints dot $308_{MCN-1}$, and print-head $303_{CN}$ prints dot $308_{CN}$ and print-head $303_{MN}$ prints dot $308_{MCN}$.

Also in the example brought forth in FIGS. 5B-5C, print-head row $302_Y$ and print-head row $302_M$ prints the yellow target-B line. Print-head $303_{M1}$ prints dot $310_{MY1}$ by a nozzle located in the first nozzle location (the first nozzle in the first line in the example above) in print-head $303_{M1}$, and print-head $303_{Y1}$ prints dot $310_{Y1}$ by a nozzle located in a second nozzle location (the fifth nozzle in the first line in the example above) in print-head $303_{Y1}$. Similarly print-head $303_{M2}$ prints dot $310_{MY2}$ and print-head $303_{Y2}$ prints dot $310_{Y2}$, print-head $303_{M3}$ prints dot $310_{MY3}$ and print-head $303_{Y3}$ prints dot $310_{Y3}$, print-head $303_{MN-1}$ prints dot $310_{MYN-1}$ and print-head $303_{YN-1}$ prints dot $310_{YN-1}$, and print-head $303_{MN}$ prints dot $310_{MYN}$ and print-head $303_{YN}$ prints dot $310_{YN}$.

In view of the above, for example, dot $306_{M11}$ is a first reference print-head target-B of dot $308_{C1}$ (i.e., the respective color print-head target-B). Dot $306_{MY1}$ is a second reference print-head target-B of dot $308_{C1}$, and dot $306_{MC1}$ is a third reference print-head target-B of dot $308_{C1}$. As a further example, dot $308_{MC1}$ is a first reference print-head target-B of dot $310_{Y1}$ (i.e., the respective color print-head target-B). Dot $312_{M12}$ is a second reference print-head target-B of dot $310_{Y1}$ and dot $310_{MY1}$ is a third reference print-head target-B of dot $310_{Y1}$.

Imager 314 acquires an image 316 of Target-B. Image 316 includes a representation of Target-B and thus of the print-heads targets-B. The representation of Target-B includes dots representations dots representations $318_{M11}$, $318_{M21}$, $318_{M21}$, $318_{M22}$, $318_{M31}$, $318_{M32}$, $318_{MN-11}$, $318_{MN-12}$, $318_{MN1}$ and $318_{MN2}$ correspond to the first reference target-B. Dots representations $320_{C11}$, $320_{C21}$, $320_{C21}$, $320_{C22}$, $320_{C31}$, $320_{C32}$, ..., $320_{CN-11}$, $320_{CN-12}$, $320_{CN1}$ and $320_{CN2}$ correspond to the cyan target-B line. Dots representations $322_{Y11}$, $322_{Y21}$, $322_{Y21}$, $322_{Y22}$, $322_{Y31}$, $322_{Y32}$, ..., $322_{YN-11}$, $322_{YN-12}$, $322_{YN1}$ and $322_{YN2}$ correspond to the yellow target-B line. Dots representations $324_{M11}$, $324_{M21}$, $324_{M21}$, $324_{M22}$, $324_{M31}$, $324_{M32}$, ..., $324_{MN-11}$, $324_{MN-12}$, $324_{MN1}$ and $324_{MN2}$ correspond to the second reference target-B line.

As mentioned above, the print-heads in the reference print-head row were aligned one with respect to the other employing Target-A. To Illustrate the use of Target-B, and with reference to FIG. 5C, consider, for example, dot representation $320_{C2}$ is associated with the print head $302_{C2}$ printing the cyan color. Dot representation $318_{M21}$, associated with the print-head $303_{M2}$ printing the reference (magenta) color, is located vertically above dot representation $320_{C2}$. Dot representation $322_{MY2}$, also associated with the print-head $303_{M2}$, printing the reference (magenta) color, is located vertically below dot representation $320_{C2}$. Thus, dot representations $318_{M21}$ (i.e., the first reference print-head target-B of print-head $303_{C2}$) and dot representation $322_{MY2}$ (i.e., the second reference print-head target-B of print-head $303_{C2}$) define a vertical line 326. The horizontal distance between dot representation $320_{C2}$ and vertical line 326 relates to the horizontal displacement of print-head $303_{C2}$. The horizontal displacement of print-head $303_{C2}$ is determined from the horizontal distance between dot representation $320_{C2}$ and vertical line 326. The vertical displacement of print-head $303_{C2}$ can be determined from the vertical distance of dot representation $320_{C2}$ from dot representations $318_{M21}$ and dot representation $322_{MY2}$.

Dot representations $320_{MC1}$ (i.e., the third reference print-head target-B of print-head $303_{C2}$), associated with reference print-head $303_{M1}$, is located horizontally to the left of dot representation $320_{C2}$. Dot representations $320_{MC2}$, associated with reference print-head $303_{M2}$, is located horizontally to the right of dot representation $320_{C2}$. Thus, dot representations $320_{MC1}$ and $320_{MC2}$ define a horizontal line 328. The vertical distance between dot representation $320_{C2}$ and horizontal line 328 relates to the horizontal displacement of print-head $303_{C2}$. The horizontal displacement of print-head $303_{C2}$ is determined from the horizontal distance between dot representation $320_{C2}$ and horizontal line 328. As mentioned above, the third reference print-head target-B is optional and provides additional information regarding the horizontal displacement of the print-heads.

When a print-head target-B is located at the edge of Target-B, for example dot representation $322_{YN}$ associated with print-head $303_{YN}$, the vertical displacement of print-head $303_{YN}$ may be determined from a horizontal line 330 defined by the horizontally nearest dot representations associated with a reference print-head, for example, dot representations $322_{MYN-1}$ and $322_{MYN}$. In general, with reference to FIG. 5D, the dot representations associated with the reference row may be employed to define a reference grid 332, according to which the horizontal and vertical displacement of the print-heads in rows, other than the reference row, may be determined. The reference grid is defined by at least one horizontal line (e.g., line 328) and at least one vertical line (e.g., line 326). The horizontal and vertical displacement of said each color print-head in color print-head rows $302_C$ and $302_Y$ is determined (e.g., by processor 106-FIG. 1) from the location of the respective color print-head patterns (e.g., dot representation $320_{C2}$ corresponding to $308_{C2}$) relative to a reference grid defined by said reference print-head patterns (e.g., $318_{M21}$, $322_{MY2}$, $320_{MC1}$ and $320_{MC2}$ corresponding to dots $306_{M21}$, $310_{MY2}$, $308_{MC1}$ and $308_{MC2}$).

In the examples brought forth above in conjunction with FIGS. 3A-3F, 4A-4E and 5A-5D, Target-A and Target-B were exemplified as including dots relating to the different colors being printed. However, Target-A and Target-B are not limited to dots. Rather, each print-head may print a respective print-head pattern. For example, the pattern may be, for example, one or more vertical lines, or one or more horizontal lines. As a further example, the pattern may be a lattice including at least one vertical line and at least one horizontal line where the lattice is printed by a respective line of nozzles in the respective print-head.

Figure 6:
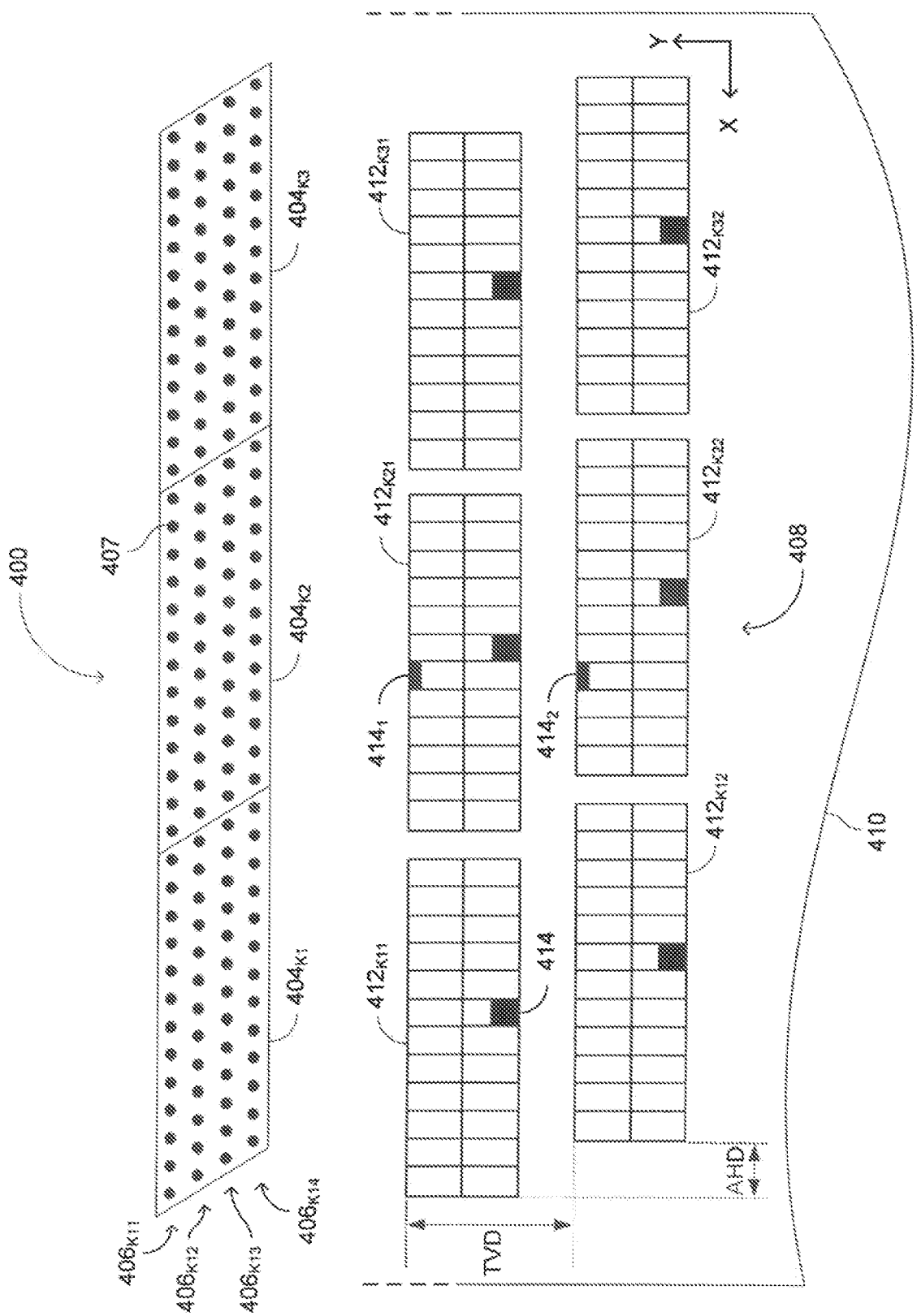
FIG. 6 is a schematic illustration of an exemplary print-head row printing a respective color target-A, in accordance with another embodiment of the disclosed technique.

Reference is now made to FIG. 6, which is a schematic illustration of an exemplary print-head row, generally referenced 400, printing a respective color target-A 408, in accordance with another embodiment of the disclosed technique. Print-head row 400 prints, for example, the color black (K) Includes a plurality of print-heads. In FIG. 6, print-head row 400 includes three print-heads, print head $404_{K1}$, print-head $404_{K2}$, and print-head $404_{NK}$. Each print-head includes a plurality of nozzle lines. In print-head row 404 each one print-heads $404_{K1}$, $404_{K2}$, and $404_{K3}$ includes, for example, 4 nozzle lines such as nozzle lines $406_{K11}$, $406_{K12}$, $406_{K13}$ and $406_{K14}$ of print head $402_{K1}$. Each nozzle line includes a plurality of nozzles such as nozzle 407. The nozzle lines are oriented in the cross-print (X) direction. In other words, the nozzle lines are oriented perpendicular to the direction of motion (Y) of the substrate. Also the nozzle lines are shifted one with respect to other in the cross-print (X) direction. In FIG. 6, print-heads $404_{K1}$, $404_{K2}$, and $404_{3K}$ are in the nominal position.

In the example brought forth in FIG. 6, color target-A 408 includes a row of print-heads targets-A. In the example brought forth in FIG. 6, target-A includes a lattice for each print-head, each lattice printed by the nozzles in the print-head. Color target-A 408 includes lattices $412_{K11}$, $412_{K12}$ and $412_{K13}$ and lattices $412_{K21}$ Lattice $412_{K22}$ Lattice $412_{K23}$, each including horizontal and vertical lines. The vertical lines in lattice $412_{K11}$ are printed by at least some of the nozzles in the first nozzle line (i.e., nozzle line $406_{K11}$) in print-head $404_{K1}$. Similarly, the vertical lines in lattice $412_{K12}$ and $412_{K13}$ are printed by at least some of the nozzles in the first nozzle line in print-head $404_{K1}$ and print-head $404_{K2}$ respectively.

The vertical lines in lattice $412_{K21}$ are printed by at least some of the nozzles in the fourth nozzle line (i.e., nozzle line $406_{K14}$) in print-head $404_{K1}$. Similarly, the vertical lines in lattice $412_{K22}$ and $412_{K23}$ are printed by at least some of the nozzles in the fourth nozzle line in print-head $404_{K1}$ and print-head $404_{K2}$ respectively. The horizontal line in lattices $412_{K11}$, $412_{K12}$ and $412_{K13}$ and lattices $412_{K21}$ Lattice $412_{K22}$ Lattice $412_{K23}$ are printed by nozzles in all the nozzles lines (i.e., not necessarily all the nozzles in the print-head) in the respective print-head (i.e., to produce a continuous line). Any two vertical lines may be employed to determine the AHD, as described above in conjunction with FIGS. 3A-3F.

Additionally, each lattice target (i.e., print-head pattern) may include a target locator mark, such as target locator mark 414, printed by designated nozzles in each print-head, and employed for identifying the lattice target in an acquired image of Target-A and for segmenting the targets. Target locators can be included in Target-B as well as further 1o exemplified below in conjunction with FIG. 76. In general, the spatial relationship between the target mark locator and lines in the lattice is known. As such, a target locator mark, such as target locator mark 414 can also be employed for virtual target completion in case some of the nozzles are clogged, or the electric signal controlling the nozzle is miss-calibrated (resulting in a weak or deviated nozzle), or in case the misalignment is such that lattices overlap or due to noise in the acquired image of the target.

Also, in some cases, the Field Of View (FOV) of a single imaging sensor is not sufficient to cover the entire width of the substrate. In such cases, an imager with two or more imaging sensors is employed to acquire an image of the full width of the substrate, the FOV of each adjacent pair of sensors exhibit an overlap therebetween. In order to be able to combine the images produced by each imaging sensor at least one "stitching" locator mark, such "stitching" locator marks $414_1$ and $414_2$, is added for each pair of adjacent imaging sensors, to at least one of the lattices at a location in which the FOV of the imaging sensors overlap. Employing targets such as lattices with target locator marks and stitching locator marks provides redundancy in the information employed for alignment of the print-heads and thus rendering the target robust for various printing conditions (i.e., either intrinsic or extrinsic to the printing press). It is noted that when a single color is employed for printing, the color target-A is also Target-A.

Figure 7A:
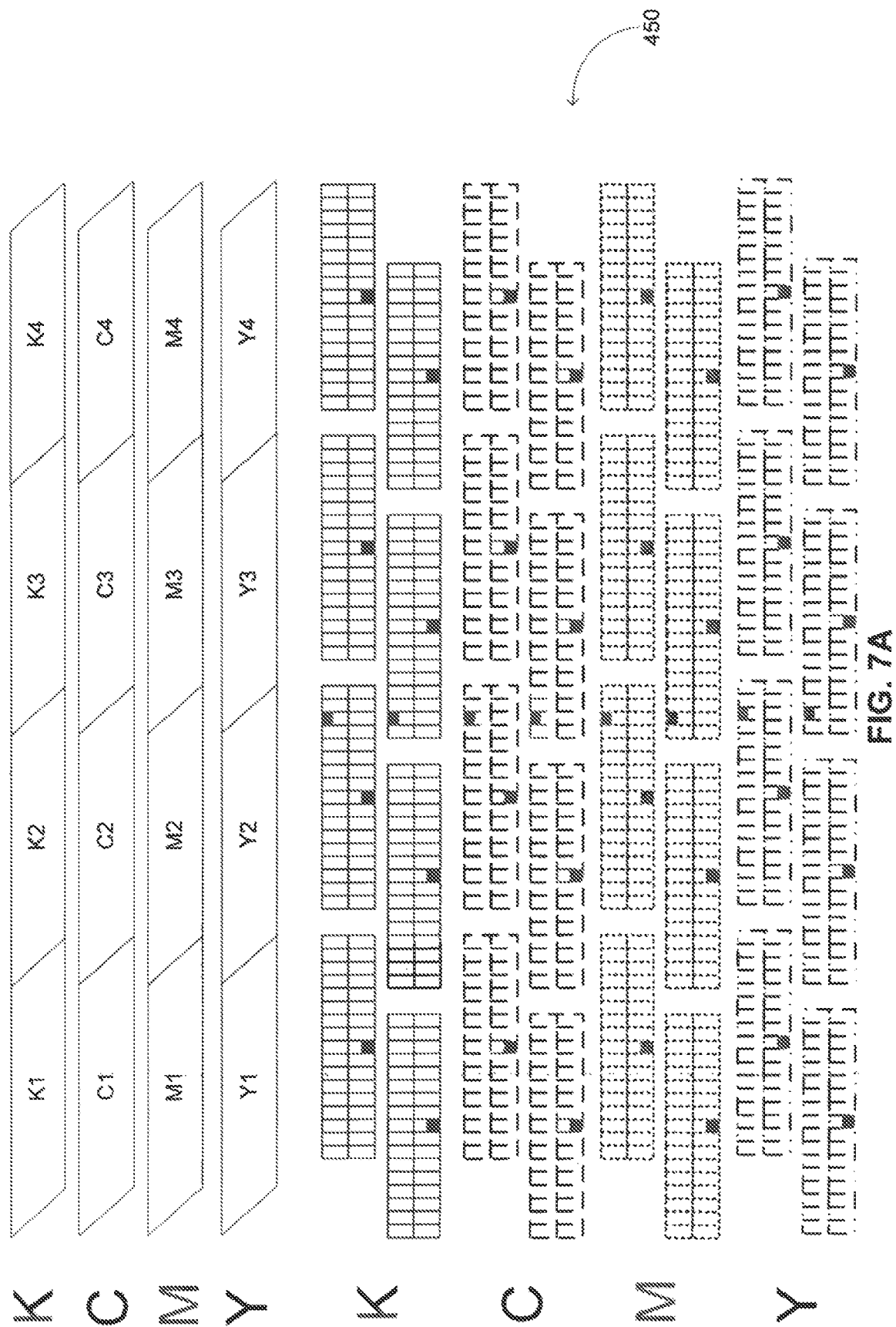
FIGS. 7A and 7B are schematic illustrations of an exemplary Target-A and an exemplary Target-B, in accordance with a further embodiment of the disclosed technique.
Figure 7B:
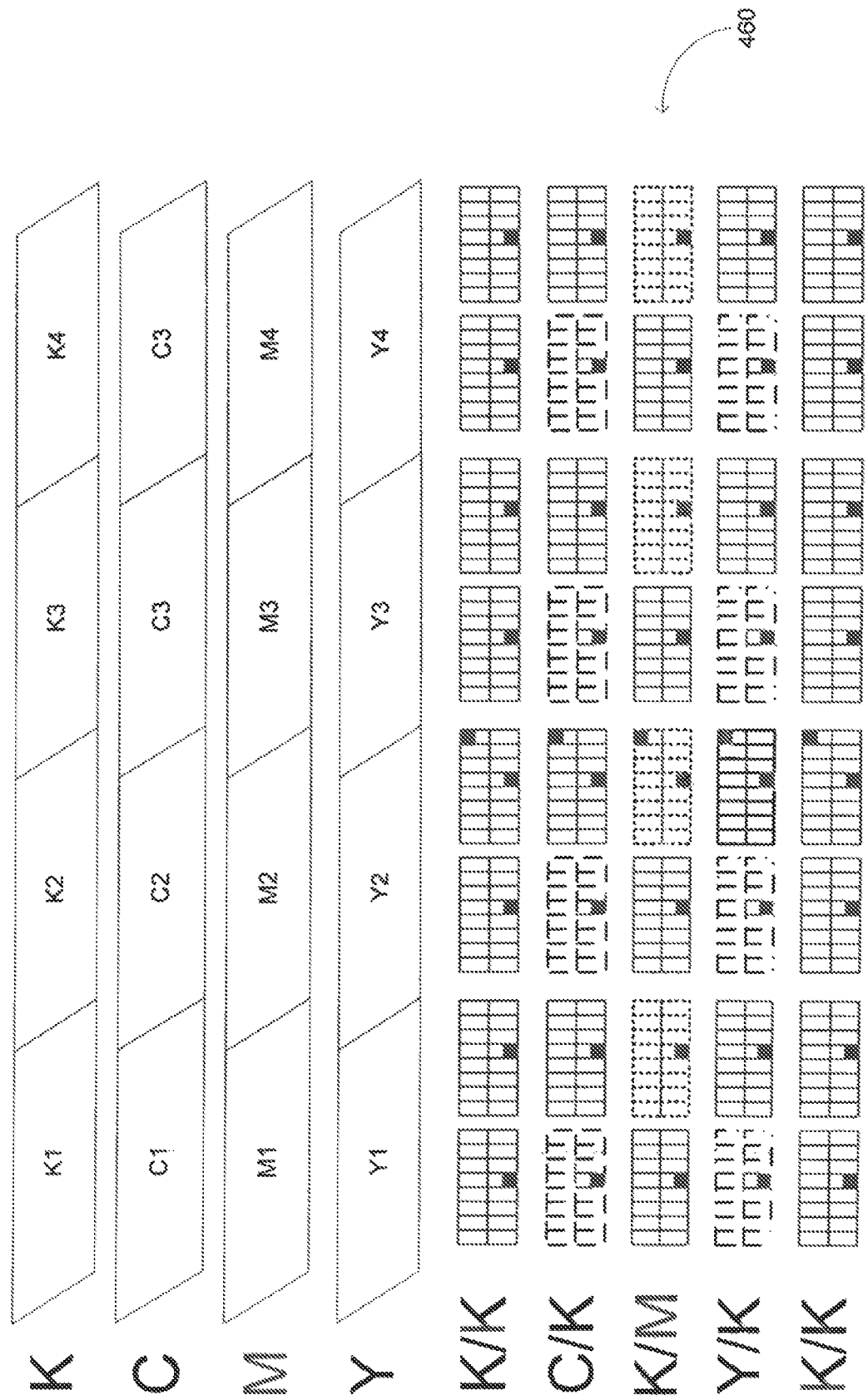

Reference is now made to FIGS. 7A and 7B which are schematic illustrations of an exemplary Target-A generally referenced 450, and an exemplary Target-B generally referenced 460, in accordance with a further embodiment of the disclosed technique. Target-A 450 and Target-B 460 relate to a four color process where the printing press prints the colors black (K), cyan (C), magenta (M) and yellow (Y). When more than one print-head row is employed for the same color, then each print-head prints a respective color target-A and color target-B at a corresponding location on the substrate. Thus, for example, two cyan target-A's are differentiated according to their location in the acquired image.

The description above exemplifies head alignment according to the disclosed technique employing either a three color process (CMY) or a four color process (CMYK). However, head alignment according to the disclosed technique may be employed with any number of colors, for example, with a seven color process (Cyan, Magenta, Yellow, Black, Orange, Violet, Green-CMYKOVG), with an eight color process (Cyan, Magenta, Yellow, Black, Orange, Violet, Green, white-CMYKOVGW), or a twelve color process.

Figure 8:
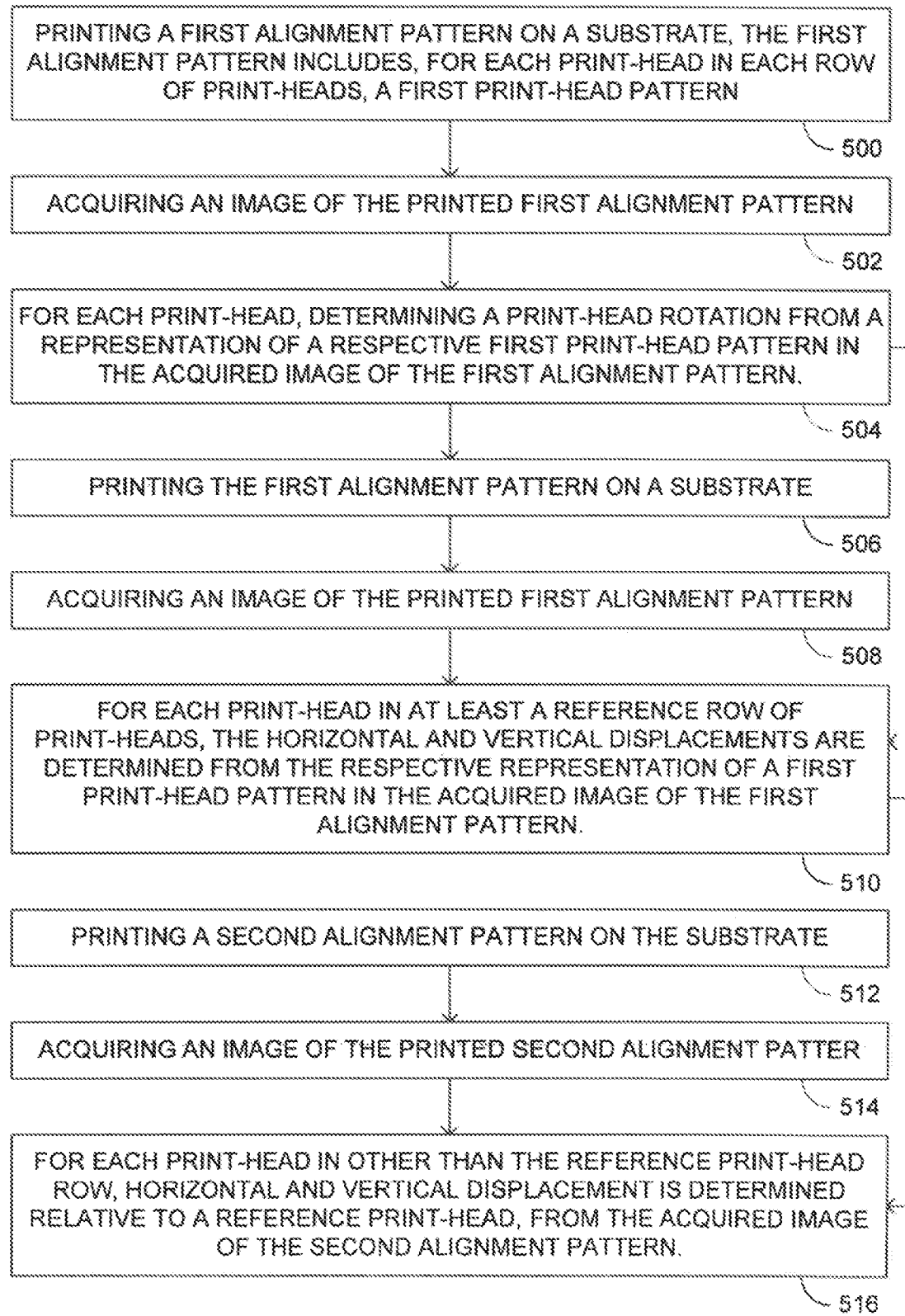
FIG. 8 is a schematic illustration of a method for aligning print-heads in a digital printing press, operative in accordance with another embodiment of the disclosed technique.

Reference is now made to FIG. 8, which is a schematic illustration of a method for aligning print-heads in a digital printing press, operative in accordance with another embodiment of the disclosed technique. In procedure 500, a first alignment pattern (i.e., Target-A) is printed on a substrate. Target-A includes, for each print-head in each row of print-heads, a first print-head pattern (i.e., a print-head target-A). The first print-head pattern includes at least two dots, printed by the same nozzles in the array of nozzles in each one of the print-heads. At least two dots in the first print-head pattern correspond to respective at least two nozzles from two different nozzle lines in the respective print-head, and the theoretical vertical distance and the theoretical horizontal distance between two of the at least two printing nozzles is known. With reference to FIGS. 1, 4A, 5A, 6A, and 7A, printing press 100 prints a first alignment pattern (i.e., Target-A), such as Target-A 261, Target-A 305, Target-A 408, or Target-A 450 on substrate 112. For example, processor 106 instructs print-head array 102 to print the first alignment pattern on a substrate 112.

In procedure 502, an image of the printed first alignment pattern is acquired. The acquired image of the printed first alignment pattern includes representations of the first print-head patterns. With reference to FIG. 1, imager 104 acquires an image of the printed first alignment pattern and provides the acquired image to processor 106.

In procedure 504, for each print-head, a print-head rotation is determined from a representation of a respective first print-head pattern, in the acquired image of the first alignment pattern. With reference to FIG. 1, processor 106 determines for each print-head a print-head rotation, from the image of the first print-head pattern.

In procedure 506, the first alignment pattern (i.e., Target-A) is printed again on a substrate. With reference to FIGS. 1, 4A, 5A, 6A, and 7A, printing press 100 prints a first alignment pattern (i.e., Target-A), such as Target-A 261, Target-A 305, Target-A 408, or Target-A 450 on substrate 112. For example, processor 106 instructs print-head array 102 to print the first alignment pattern again on a substrate 112.

In procedure 508, an image of the printed first alignment pattern is acquired. The acquired image of the printed first alignment pattern includes representations of the first print-head patterns. With reference to FIG. 1, Imager 104 acquires an image of the printed first alignment pattern and provides the acquired image to processor 106.

In procedure 510, for the print-heads in at least a reference row of print-heads, the horizontal and vertical displacements one with respect to the other are determined, from the acquired image of the first alignment pattern. The horizontal and vertical displacements of print-heads in rows other than the reference row, one with respect to the other, may also be determined from the acquired image of the first alignment pattern. Furthermore, horizontal and vertical displacements of print-heads in rows other than the reference row, relative to a reference print-head (i.e., a print-head in a reference row) may also be determined from the acquired image of the first alignment pattern. With reference to FIG. 1, processor 106 determines for each print-head in at least a reference row of print-heads the horizontal and vertical displacement, from the acquired image of the first alignment pattern. From procedure 510 the method proceeds to procedure 516.

In procedure 512, a second alignment pattern (i.e., Target-B) is printed on a substrate. The second alignment pattern includes an array of second print-head patterns (print-head targets-B) where each print-head is associated with a respective second print-head pattern. Target-B was described herein above in conjunction with FIGS. 5A-5D. With Reference to FIGS. 1, 5B and 7B, printing press 100 prints a Target-B, such as Target-B 311 or Target-B 460 on substrate 112. For example, processor 106 instructs print-head array 102 to print the second alignment pattern on a substrate 112.

In procedure 514, an image of the printed second alignment pattern is acquired. The acquired image of the printed first alignment pattern includes representations of the second print-head patterns. With reference to FIG. 1, imager 104 acquires an image of the printed Target-B.

In procedure 516, for each print-head in other than the reference print-head row, horizontal and vertical displacement is determined relative to a reference print-head, from the acquired image of the second alignment pattern. With reference to FIG. 1, for each print-head in other than the reference print-head row, processor 106 determines horizontal and vertical displacement relative to a reference print-head, from image of the second print-head pattern.

With regards to FIG. 8, it is noted that procedures 506 and 508 are optional as indicate by the dashed line from procedure 504 to procedure 510. When the location of the rotation axis of the print-head, relative to the location of the nozzles printing the first print-head pattern is known, then a single image is sufficient to align the rotation angle of the print-heads as well as align the horizontal and vertical displacement of the reference row of print-heads. The rotation angle alignment, as well as the horizontal and vertical displacement may be implemented logically (i.e., from the image data). Also, as indicated in FIG. 8, procedures 512 and 514 may be performed at any time independent of procedures 500-510, for example, when the alignment according the first alignment pattern is performed logically (i.e., from image, without actually performing corrective action). It is also noted that when the acquired image of the first alignment pattern is employed to determine the horizontal and vertical displacements of print-heads in rows other than the reference row, relative to a reference print-head (i.e., a print-head in a reference row), procedures 508-516 are optional. Implementing these procedures may depend, for example, on the errors involved in determining the horizontal and vertical displacements of print-heads in rows other than the reference row, relative to a reference print-head, employing the acquired image of the first alignment pattern.

It will be appreciated by persons skilled in the art that the disclosed technique is not limited to what has been particularly shown and described hereinabove. Rather the scope of the disclosed technique is defined only by the claims, which follow.

The invention claimed is:

1. A system for aligning print-heads in a printing press, the printing press includes a print-head array, the print head array includes a plurality of print-head rows, where each print-head row includes a plurality of print-heads, the print-heads in each print-head row configured to print a color associated with the print-head row, each print-head includes an array of nozzles, the array of nozzles including a plurality of nozzle lines, the system comprising:

an imager, said imager including at least one imaging sensor, said imager configured to acquire an image of a printed first alignment pattern and an image of a printed second alignment pattern, wherein said first alignment pattern includes a print-head pattern for each print-head in each row of print-heads, said print-head pattern including at least two dots corresponding to a respective nozzle of at least two nozzles from two different nozzle lines of the plurality of nozzle lines in a respective print-head; and a processor, configured to receive said image of said first alignment pattern and said image of said second alignment pattern, said processor further configured to determine alignment of reference print-heads in at least a reference row of print-heads from said image of said first alignment pattern, said processor further configured to determine alignment of color print-heads in rows other than said reference row of print-heads, relative to said reference print-heads, from said image of the second alignment pattern.

2. The system according to claim 1, wherein a theoretical vertical distance and a theoretical horizontal distance between two of said at least two printing nozzles is known.

3. The system according to claim 2, wherein said processor is further configured to determine said actual horizontal distance between said at least two dots, and to align said rotation angle of each print head from said theoretical vertical distance, said theoretical horizontal and said actual horizontal distance.

4. The system according to claim 3, wherein said rotation angle of said imager is determined from an angle of said line in said acquired image.

5. The system according to claim 2, wherein said processor is further configured to determine a vertical displacement of said reference print-heads from a line fitted to dots printed by a same nozzle line in said each print-head in said reference row of print-heads.

6. The system according to claim 1, wherein said processor is further configured to determine a horizontal displacement of each print-head in a reference row of print-heads from a local grid determined for dots printed by a same nozzle line in said each print-head in said reference row of print-heads.

7. The system according to claim 1, wherein each said print-head pattern includes a respective print-head pattern locator mark for identifying said respective print-head pattern in said acquired image.

8. The system according to claim 1, wherein said imager includes at least two imaging sensors, and wherein said first alignment pattern includes at least one stitching locator mark for each pair of adjacent imaging sensors, at a location in which a field of view said adjacent pair of imaging sensors overlap.

9. The system according to claim 1, wherein said second alignment pattern includes a plurality of color print-head patterns and a plurality of reference print-head patterns, each reference print-head pattern configured to be printed by a respective one of said reference print-heads, each color print-head pattern configured to be printed by a respective color print-head in a print-head row other than said reference row, each color print-head pattern associated with a respective first reference print-head pattern and a respective second reference print-head pattern, said first reference print-head pattern and said second reference print-head pattern configured to be printed by the respective one of said reference print-heads above and below said respective color print-head pattern in a vertical direction, said color print-head pattern configured to be printed by a respective at least one color print-head nozzle having a same relative location in a corresponding array of nozzles of a respective color print-head as a respective at least one reference print-head nozzle in the respective one of said reference print-heads configured for printing said first reference print-head pattern and said second reference print-head pattern, said color print-head pattern configured to be printed by a respective color print-head having a same relative location in a corresponding row of print heads as the respective one of said reference print-heads configured for printing said first print-head pattern and said second print-head pattern.

10. The system, according to claim 1, wherein said second alignment pattern further including a third reference print-head pattern respective of said each color print-head pattern, said third reference print-head pattern configured to be printed by said reference print-head on a left or right side in a horizontal direction of said color print-head pattern, said side alternating between rows other than said reference row, said third reference print-head pattern configured to be printed by an at least one nozzle different from said at least one nozzle configured for printing said first print-head pattern and said second print head pattern but located on a same line of nozzles.

11. The system according to claim 1, wherein said processor determines said horizontal and vertical displacement of said each color print-head from a location of said color print-head patterns relative to a reference grid defined by said reference print-head patterns.

12. The system according to claim 1, wherein each said reference print-head pattern and each said color print-head pattern includes a respective print-head pattern locator mark for identifying said respective print-head pattern in said acquired image.

13. The system according to claim 1, wherein said imager includes at least two imaging sensors, and
wherein said second alignment pattern includes at least one stitching locator mark for each pair of adjacent imaging sensors, to at least one of said at least one print-head pattern, at a location in which a field of view said adjacent pair of imaging sensors overlap.

14. A method for aligning print-heads in a printing press, the printing press including a print-head array, the print head array including a plurality of print-head rows, each print-head row including a plurality of print-heads, the print-heads in each print-head row configured to print a color associated with the print-head row, each print-head including an array of nozzles, the array of nozzles including a plurality of nozzle lines, the method including the steps of:
printing a printed first alignment pattern on a substrate, the printed first alignment pattern including a first print-head pattern respective of each said print-head in each of said print-head rows, wherein said first alignment pattern includes a print-head pattern for each print-head in each row of print-heads, said print-head pattern including at least two dots corresponding to a respective nozzle of at least two nozzles from two different nozzle lines of the plurality of nozzle lines in a respective print-head;
acquiring an image of the printed first alignment pattern;
for each print-head, determining from the acquired image of said printed first alignment pattern a respective print-head rotation angle;
determining horizontal and vertical displacement respective of each said print-head in at least a reference row of print-heads, from said acquired image of said printed first alignment pattern;
printing a printed second alignment pattern on said substrate;
acquiring an image of said printed second alignment pattern; and
determining horizontal and vertical displacement of each print-head other than said reference print-heads, relative to a reference print-head, from said acquired image of the printed second alignment pattern.

15. The method according to claim 14, wherein a theoretical vertical distance and a theoretical horizontal distance between two of said at least two printing nozzles is known.

16. The method according to claim 15, comprising determining rotation angle alignment, horizontal displacement, and vertical displacement, and
wherein determining said rotation angle alignment includes determining an actual horizontal distance between said at least two dots, and aligning a rotation angle of each print head using said theoretical vertical distance, said theoretical horizontal distance, and said actual horizontal distance.

17. The method according to claim 16, wherein determining said vertical displacement of each print-head in a reference row of print-heads includes determining a line fitted to dots printed by a same nozzle line in said each print-head in said reference row of print-heads.

18. The method according to claim 16, wherein determining said horizontal displacement of each print-head in a reference row of print-heads includes determining a local grid for dots printed by a same nozzle line in said each print-head in said reference row of print-heads.

19. The method according to claim 14, wherein each said print-head pattern includes a respective print-head pattern locator mark for identifying said respective print-head pattern in said acquired image.

20. The method according to claim 14, wherein said first alignment pattern includes at least one stitching locator mark for each pair of adjacent imaging sensors, at a location in which a field of view said adjacent pair of imaging sensors overlap.

21. The method according to claim 14, wherein said second alignment pattern includes a plurality of color print-head patterns and a plurality of reference print-head patterns,
  each reference print-head pattern is printed by a respective reference print-head of a reference row,
  each color print-head pattern is printed by a respective color print-head in a row other than said reference row,
  each color print-head pattern is associated with a respective first reference print-head pattern and a respective second reference print-head pattern,
  said first reference print-head pattern and said second reference print-head pattern are printed by a respective reference print-head above and below said respective color print-head pattern in a vertical direction,
  said color print-head pattern is printed by a respective at least one color print-head nozzle having a same relative location within a respective array of nozzles of a respective print-head thereof as a respective at least one reference print-head nozzle in a respective array of the respective reference print-head, and
  said color print-head pattern is printed by a respective color print-head having a same row location as the respective reference print-head for printing said first print-head pattern and said second print-head pattern.

22. The method according to claim 21, wherein said second alignment pattern further includes a third reference print-head pattern respective of said each color print-head pattern,
  said third reference print-head pattern is printed by said reference print-head on a left or right side in a horizontal direction relative to said color print-head pattern, said side alternating between rows other than said reference row,
  said third reference print-head pattern is printed by an at least one nozzle different from said at least one nozzle configured for printing said first print-head pattern and said second print-head pattern but located on a same line of nozzles, and
  said third print-head pattern is printed by said respective reference print-head having the same row location as the respective color print head.

23. The method according to claim 21, includes determining a horizontal and vertical displacement of said each color print-head from a location of said color print-head patterns relative to a reference grid defined by said reference print-head patterns.

24. The method according to claim 21, wherein each said print-head pattern includes a respective print-head pattern locator mark for identifying the said respective print-head pattern in said acquired image.

25. The method according to claim 21, said second alignment pattern includes at least one stitching locator mark for each pair of adjacent imaging sensors, at a location in which a field of view said adjacent pair of imaging sensors overlap.

* * * * *